(12) United States Patent
Yan et al.

(10) Patent No.: US 11,796,875 B2
(45) Date of Patent: Oct. 24, 2023

(54) DISPLAY ASSEMBLY, DISPLAY DEVICE AND DRIVING METHOD THEREFOR

(71) Applicant: Honor Device Co., Ltd., Shenzhen (CN)

(72) Inventors: Bin Yan, Shenzhen (CN); Yan Lv, Shenzhen (CN); Yankai Niu, Shenzhen (CN); Bangshi Yin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 130 days.

(21) Appl. No.: 17/413,385

(22) PCT Filed: Nov. 30, 2019

(86) PCT No.: PCT/CN2019/122231
§ 371 (c)(1),
(2) Date: Jun. 11, 2021

(87) PCT Pub. No.: WO2020/119490
PCT Pub. Date: Jun. 18, 2020

(65) Prior Publication Data
US 2022/0026771 A1     Jan. 27, 2022

(30) Foreign Application Priority Data

Dec. 13, 2018 (CN) .......................... 201811526888.7
Jun. 17, 2019 (CN) .......................... 201910523181.9

(51) Int. Cl.
| | | |
|---|---|---|
| G02F 1/1362 | (2006.01) | |
| F21V 8/00 | (2006.01) | |
| G02F 1/1335 | (2006.01) | |
| G02F 1/1368 | (2006.01) | |

(52) U.S. Cl.
CPC ..... *G02F 1/136209* (2013.01); *G02B 6/0088* (2013.01); *G02F 1/1368* (2013.01); *G02F 1/133502* (2013.01); *G02F 1/133528* (2013.01)

(58) Field of Classification Search
CPC ......... G02F 1/136209; G02F 1/133512; G02F 1/133502; G02F 1/133308; G02F 1/133317; H04M 1/0264
See application file for complete search history.

(56) References Cited

U.S. PATENT DOCUMENTS

| | | |
|---|---|---|
| 9,395,569 B2 | 7/2016 | Kim et al. |
| 10,564,464 B2 | 2/2020 | Wang et al. |

(Continued)

FOREIGN PATENT DOCUMENTS

| | | |
|---|---|---|
| CN | 102636896 A | 8/2012 |
| CN | 106773219 A | 5/2017 |

(Continued)

OTHER PUBLICATIONS

Tang, English translation for CN-108919544-A (Year: 2018).*

*Primary Examiner* — Jonathan Y Jung
(74) *Attorney, Agent, or Firm* — Slater Matsil, LLP

(57) ABSTRACT

A display component includes a display panel. The display panel includes an array substrate and a counter substrate, and the display panel includes a display region, where the display region includes a pixel region, a transparent region, and a light shielding region. A first light shielding pattern located in the light shielding region is disposed on a side that is of the array substrate and that is away from the counter substrate, and the first light shielding pattern is disposed around the transparent region.

18 Claims, 33 Drawing Sheets

(56) References Cited

U.S. PATENT DOCUMENTS

| | | | |
|---|---|---|---|
| 10,761,331 B2 | 9/2020 | Li et al. | |
| 11,057,554 B2 | 7/2021 | Nakamura et al. | |
| 2001/0022365 A1* | 9/2001 | Murade | H01L 29/78633 |
| | | | 257/E27.113 |
| 2012/0206669 A1 | 8/2012 | Kim et al. | |
| 2013/0176512 A1* | 7/2013 | Posner | G02F 1/1333 |
| | | | 349/193 |
| 2017/0090113 A1 | 3/2017 | Yuki et al. | |
| 2018/0092534 A1* | 4/2018 | Nabhan | A61B 3/10 |
| 2020/0186688 A1* | 6/2020 | Chen | H04N 23/54 |
| 2021/0109398 A1* | 4/2021 | Son | G06F 1/1643 |
| 2021/0359053 A1 | 11/2021 | Shan et al. | |
| 2022/0026771 A1 | 1/2022 | Yan et al. | |

FOREIGN PATENT DOCUMENTS

| | | | | |
|---|---|---|---|---|
| CN | 207264062 U | 4/2018 | | |
| CN | 207264695 U | 4/2018 | | |
| CN | 108051926 A | 5/2018 | | |
| CN | 108540603 A | 9/2018 | | |
| CN | 108594524 A | 9/2018 | | |
| CN | 108628043 A | 10/2018 | | |
| CN | 108681131 A | 10/2018 | | |
| CN | 108681150 A | 10/2018 | | |
| CN | 108873471 A | 11/2018 | | |
| CN | 108897174 A | 11/2018 | | |
| CN | 108900672 A | 11/2018 | | |
| CN | 108919544 A | 11/2018 | | |
| CN | 108919544 A | * | 11/2018 | ....... G02F 1/133512 |
| CN | 108919545 A | 11/2018 | | |
| CN | 108957868 A | 12/2018 | | |
| CN | 108983468 A | 12/2018 | | |
| CN | 109100892 A | 12/2018 | | |
| CN | 109541833 A | 3/2019 | | |
| CN | 110244484 A | 9/2019 | | |
| JP | 2009145760 A | 7/2009 | | |
| WO | 2018216545 A1 | 11/2018 | | |
| WO | 2019205627 A1 | 10/2019 | | |

* cited by examiner

DISPLAY ASSEMBLY, DISPLAY DEVICE AND DRIVING METHOD THEREFOR

CROSS-REFERENCE TO RELATED APPLICATIONS

This application is a National Stage of International Application No. PCT/CN2019/122231, filed on Nov. 30, 2019, which claims priority to Chinese Patent Application No. 201811526888.7, filed with the China National Intellectual Property Administration on Dec. 13, 2018 and entitled "DISPLAY COMPONENT, DISPLAY APPARATUS, AND METHOD FOR DRIVING DISPLAY APPARATUS", and claims priority to Chinese Patent Application No. 201910523181.9, filed with the China National Intellectual Property Administration on Jun. 17, 2019 and entitled "DISPLAY COMPONENT, DISPLAY APPARATUS, AND METHOD FOR DRIVING DISPLAY APPARATUS", which are incorporated herein by reference in their entirety.

TECHNICAL FIELD

This application relates to the field of display technologies, and in particular, to a display component, a display apparatus, and a method for driving the display apparatus.

BACKGROUND

With development of display technologies, narrow-frame and frame-less display apparatuses not only have desirable appearances, but also can display more content and provide better user experience, and therefore have become increasingly popular among future display products of terminals. In a conventional display product of a terminal in the market, a frame needs to be relatively wide for disposing of a front-facing camera.

However, this inevitably decreases a screen-to-body ratio of a screen, affecting user experience. Therefore, how to increase the screen-to-body ratio of the screen to a maximum extent becomes a technical problem to be resolved by a person skilled in the art.

SUMMARY

This application provides a display component, a display apparatus, and a method for driving the display apparatus, to alleviate light leakage.

To achieve the foregoing objective, the following technical solutions are used in this application:

According to a first aspect of this application, a display component is provided. The display component includes a display panel. The display panel includes an array substrate and a counter substrate. The display panel includes a display region. The display region includes a pixel region, a transparent region, and a light shielding region located between the pixel region and the transparent region. The light shielding region is disposed around the transparent region. A first light shielding pattern located in the light shielding region is disposed on a side that is of the array substrate and that is away from the counter substrate. The first light shielding pattern is disposed around the transparent region. The display region of the display panel is divided into the pixel region, the transparent region, and the light shielding region located between the pixel region and the transparent region, and the first light shielding pattern is disposed on the array substrate and in correspondence with the light shielding region, so that light emitted from the pixel region to the transparent region can be absorbed, to alleviate light leakage and implement disposition of a front-facing camera in the display region.

Optionally, a second light shielding pattern located in the light shielding region is disposed on the counter substrate, and the second light shielding pattern is disposed around the transparent region, to further alleviate light leakage.

Optionally, the display component further includes a backlight module located on a side that is of the display panel and that is away from a light emergent surface. The backlight module has a first hollow-out region, the first hollow-out region is defined by a side frame of the backlight module, and the side frame is opaque. In a thickness direction of the display component, an edge of the first hollow-out region is located in the light shielding region. The display component further includes a third light shielding pattern. The third light shielding pattern is located in the light shielding region and is in contact with both the display panel and the side frame. The third light shielding pattern is disposed around the transparent region and is used to absorb light that leaks from a side that is of the side frame and that is close to the display panel. This can ensure that the light shielding region isolates a light ray between the transparent region and the pixel region, and avoid light leakage from the pixel region to the transparent region, thereby ensuring a display effect and an imaging effect of the front-facing camera. In addition, the third light shielding pattern is disposed, so that an adhesive frame that is in the backlight module and that is located between the side frame and a reflector plate, a light guide plate, or an optical film can be removed in this application, thereby reducing a ratio of the light shielding region.

Optionally, the side frame is in contact with the display panel. The third light shielding pattern is disposed on a side that is of the side frame and that is close to the first hollow-out region.

Optionally, there is a gap between the side frame and the display panel. The third light shielding pattern is disposed at least in the gap between the side frame and the display panel. When there is a gap between the side frame and the display panel, on one hand, the third light shielding pattern is filled in the gap and absorbs a light ray emitted from the backlight module to the gap between the side frame and the display panel; on the other hand, a bonding area of the third light shielding pattern is increased, so that the side frame and the display panel are more securely connected.

Optionally, a lower polarizer is further disposed on the array substrate, and the lower polarizer has a second hollow-out region. In the thickness direction of the display component, a projection of a side face that is of the lower polarizer and that defines the second hollow-out region is located in the light shielding region.

Optionally, the lower polarizer is disposed on a side that is of a first substrate and that is close to the backlight module, so that fabrication is easier.

Optionally, the side frame is directly in contact with the lower polarizer. The first light shielding pattern is located between the first substrate and the lower polarizer. The third light shielding pattern covers the side face that is of the lower polarizer and that defines the second hollow-out region and a bottom face of a portion that is of the lower polarizer and that extends beyond the side frame. The first light shielding pattern is disposed between the first substrate and the lower polarizer, and the third light shielding pattern covers the side face that is of the lower polarizer and that defines the second hollow-out region and the bottom face of the portion that is of the lower polarizer and that extends beyond the side frame, so that light emitted from the backlight module to the light shielding region and the transparent region can be absorbed to a maximum extent.

On this basis, optionally, a side face that is of the first light shielding pattern and that is close to the transparent region extends beyond the side face that is of the lower polarizer and that defines the second hollow-out region. The first light shielding pattern can absorb more light emitted to the light shielding region and the transparent region.

Optionally, the side face that is of the lower polarizer and that defines the second hollow-out region is located on a side that is of the side frame and that is away from the first hollow-out region. The first light shielding pattern is located between the first substrate and the lower polarizer and extends at least above the side frame. There is a gap between the side frame and the first light shielding pattern. The first light shielding pattern is disposed between the first substrate and the lower polarizer and extends at least above the side frame, and the third light shielding pattern is disposed at least in the gap between the side frame and the first light shielding pattern (that is, between the side frame and the display panel), so that light emitted from the backlight module to the light shielding region and the transparent region can be absorbed to a maximum extent.

On this basis, optionally, the first light shielding pattern has a hollow-out portion. The third light shielding pattern is filled in the hollow-out portion and is in contact with the first substrate. The hollow-out portion is disposed in the first light shielding pattern, so that the third light shielding pattern can be limited and fabrication of the third light shielding pattern is easier.

Optionally, the side face that is of the lower polarizer and that defines the second hollow-out region is located on a side that is of the side frame and that is away from the first hollow-out region. The first light shielding pattern is located in the second hollow-out region of the lower polarizer and extends at least above the side frame. This can avoid that a light ray leaks from the side face that is of the lower polarizer and that defines the second hollow-out region.

On this basis, optionally, the first light shielding pattern is directly in contact with the lower polarizer. There is a gap between the side frame and the first light shielding pattern. The first light shielding pattern is directly in contact with the lower polarizer, so that a size of the first light shielding pattern may be comparatively large, thereby absorbing as many light rays as possible.

Optionally, the display component further includes a fourth light shielding pattern disposed between the display panel and the backlight module. In the thickness direction of the display component, the fourth light shielding pattern is disposed opposite to the light shielding region. The fourth light shielding pattern is disposed around the transparent region. The fourth light shielding pattern overlaps with a portion that is of the lower polarizer and that is close to the first light shielding pattern and a portion that is of the first light shielding pattern and that is close to the lower polarizer. The fourth light shielding pattern is located on the side that is of the side frame and that is away from the first hollow-out region. The fourth light shielding pattern is in contact with at least the backlight module. The fourth light shielding pattern cooperates with the first light shielding pattern, so that as many light rays can be absorbed as possible, to avoid light leakage.

Optionally, the display component further includes a fourth light shielding pattern disposed between the display panel and the backlight module. In the thickness direction of the display component, the fourth light shielding pattern is disposed opposite to the light shielding region. The fourth light shielding pattern is disposed around the transparent region. The fourth light shielding pattern overlaps with a portion that is of the lower polarizer and that is close to the first light shielding pattern and a portion that is of the first light shielding pattern and that is close to the lower polarizer. The fourth light shielding pattern extends above the side frame and is in contact with the side frame. The fourth light shielding pattern cooperates with the first light shielding pattern, so that as many light rays can be absorbed as possible, to avoid light leakage.

Optionally, a fifth light shielding pattern located in the light shielding region is further disposed on the array substrate, and the fifth light shielding pattern is disposed around the transparent region. The fifth light shielding pattern is located between the first substrate and a TFT circuit layer disposed on a side that is of the first substrate and that is close to the counter substrate, and the fifth light shielding pattern covers a part of the lower polarizer. When the fifth light shielding pattern is located between the first substrate and the TFT circuit layer, during forming of the array substrate, the fifth light shielding pattern is first fabricated, and then the TFT circuit layer is fabricated in the pixel region. Therefore, the fifth light shielding pattern can isolate light reflection of a TFT circuit, thereby further enhancing light shielding.

Optionally, the third light shielding pattern extends from the gap between the side frame and the display panel to the side that is of the side frame and that is close to the first hollow-out region, and is in contact with a portion of a side face of the side frame. Based on that a light ray is prevented from leaking out from the gap between the side frame and the display panel, a contact area of the third light shielding pattern and the side frame can be further increased, so that the display panel and the backlight module are better fixed.

Optionally, in the thickness direction of the display component, a projection of the first light shielding pattern overlaps with the light shielding region.

Optionally, in the thickness direction of the display component, a projection of the second light shielding pattern overlaps with the light shielding region.

Optionally, a black matrix located in the pixel region is further disposed on the counter substrate, and the second light shielding pattern and the black matrix are on a same layer and are made of a same material. This can simplify fabrication.

Optionally, the side frame includes a side panel that is disposed perpendicular to the display panel and a top panel that is parallel to the display panel, and the top panel is connected to an end that is of the side panel and that is close to the display panel.

Optionally, the side frame includes the side panel that is disposed perpendicular to the display panel.

Optionally, an anti-glare layer located at least on an inner wall that is of the side frame and that faces the first hollow-out region is further disposed on the backlight module. The anti-glare layer is disposed to further absorb light, so that the front-facing camera has a better imaging effect.

Optionally, an upper polarizer is further disposed on the counter substrate, and the upper polarizer has a third hollow-out region. In the thickness direction of the display component, a projection of a side face that is of the upper polarizer and that defines the third hollow-out region is located in the light shielding region.

Optionally, a TFT circuit layer is disposed on a side that is of the first substrate of the array substrate and that is close to the counter substrate. The TFT circuit layer includes a fourth hollow-out region, and an edge of the fourth hollow-out region is located in the light shielding region. The TFT circuit layer can shield light and simplify fabrication.

According to a second aspect of this application, a display apparatus is provided. The display apparatus includes the foregoing display component and further including a front-facing camera, where the front-facing camera is embedded in a first hollow-out region of a backlight module.

Optionally, in a direction from a display panel to the front-facing camera, not all cross-sectional areas of the front-facing camera are the same and the cross-sectional areas of the front-facing camera gradually increase. In this way, the front-facing camera can be closer to the display panel and have a better photographing effect. In addition, a part of space can be saved in a vertical direction and a problem of ripples is alleviated.

Optionally, the front-facing camera is in an inverted T shape, and a chamfer is disposed on a side that is of the front-facing camera and that is close to the display panel.

Optionally, the front-facing camera includes a lens barrel and a lens group accommodated in the lens barrel. The lens barrel is exposed from a light incident surface of the lens group. In the thickness direction of the display component, a distance from the light incident surface to the display panel is less than a distance from a surface that is of the lens barrel and that faces the display panel to the display panel.

Optionally, the display apparatus is a terminal device.

According to a third aspect of this application, a method for driving a display apparatus is provided. A front-facing camera of the display apparatus is disposed opposite to a transparent region of a display region, the display region further includes a pixel region and a light shielding region, and the light shielding region is located between the transparent region and the pixel region. On this basis, the method for driving includes: when the front-facing camera works, controlling at least a part of the pixel region to be in a black state, where the part includes at least a region located around the light shielding region; and when the front-facing camera photographs, controlling at least the part of the pixel region to be in the black state, to reduce impact on photographing caused by light leakage.

Optionally, the controlling at least a part of the pixel region to be in a black state includes: controlling all sub-pixels in at least the part of the pixel region to display a black picture. Alternatively, a backlight module of the display apparatus is a direct-type backlight module, and the controlling at least a part of the pixel region to be in a black state includes: controlling a light source of a region that is in the direct-type backlight module and that is opposite to at least the part of the pixel region to be turned off.

Optionally, the part in the black state is located at a top, a bottom, a side, a corner, or any position in a full screen of the display apparatus, and/or a shape of the part in the black state is any closed pattern.

Optionally, the controlling at least a part of the pixel region to be in a black state includes: controlling the backlight module of the display apparatus to be turned off.

REFERENCE NUMERALS

1: frame; 2: cover glass; 3: display panel; 4: backlight module; 5: circuit board; 6: front-facing camera; 31: display region; 32: peripheral region; 41: light source; 42: reflector plate; 43: light guide plate; 44: optical film; 46: first hollow-out region; 47: side frame; 471: side panel; 472: top panel; 48: bottom panel; 49: anti-glare layer; R: red subpixel; G: green subpixel; B: blue subpixel; 300: array substrate; 310: first substrate; 311: pixel region; 312: light shielding region; 313: transparent region; 320: first insulation layer; 330: pixel electrode; 350: common electrode; 360: second insulation layer; 370: TFT circuit layer; 400: counter substrate; 401: first light shielding pattern; 402: second light shielding pattern; 403: third light shielding pattern; 404: fourth light shielding pattern; 405: fifth light shielding pattern; 406: hollow-out portion; 407: fourth hollow-out region; 410: second substrate; 420: color filter layer; 431: first light shielding strip; 432: second light shielding strip; 500: liquid crystal layer; 800: lower polarizer; 801: second hollow-out region; 900: upper polarizer; and 901: third hollow-out region.

DETAILED DESCRIPTION OF ILLUSTRATIVE EMBODIMENTS

Unless otherwise defined, technical terms or scientific terms used in this application should have common meanings understood by a person skilled in the art. Terms "first", "second", "third", "fourth", "fifth", and similar words used in the specification and claims of this application do not represent any order, quantity, or importance, and instead are only used to distinguish different components. Therefore, a feature defined by "first", "second", "third", "fourth", and "fifth" may explicitly or implicitly include one or more features. In the descriptions of the embodiments of this application, unless otherwise stated, "a plurality of" means two or more than two.

Position terms such as "left", "right", "upper", and "lower" are defined relative to an illustrative position of a display component in the accompanying drawings. It should be understood that these direction terms are relative concepts and are used for relative description and clarification, and may vary accordingly depending on a position change of an array substrate or a display apparatus.

Figure 1:
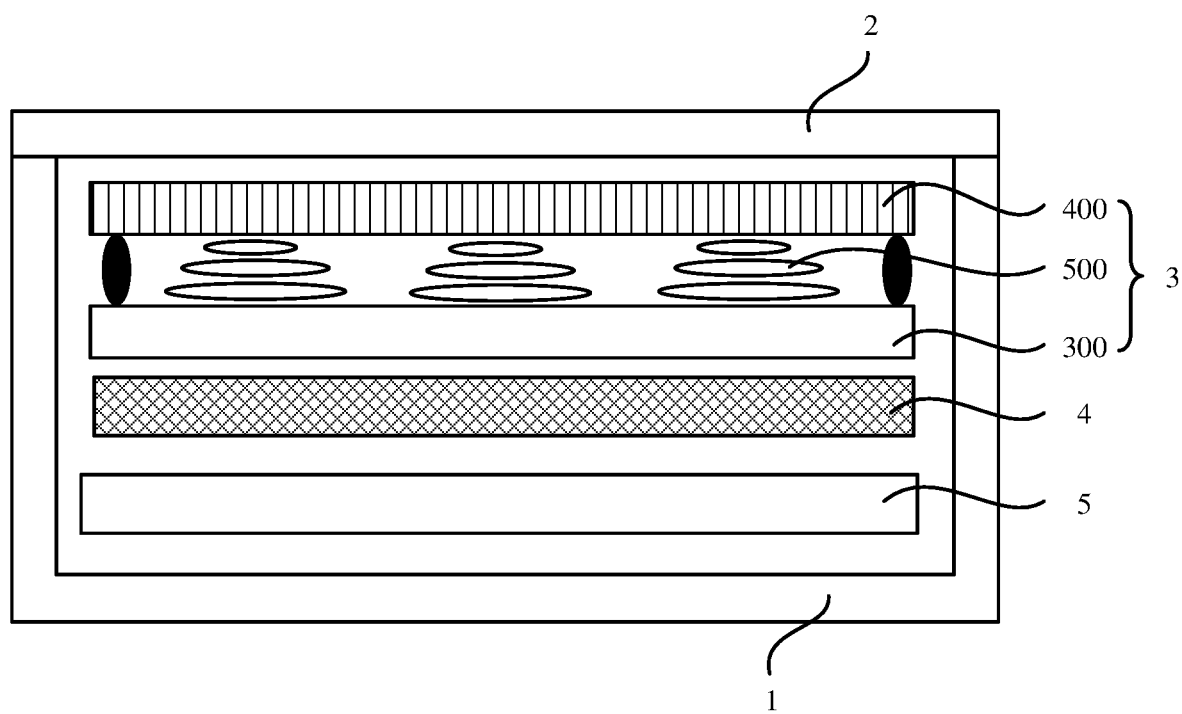
FIG. 1 is a schematic structural diagram of a liquid crystal display apparatus according to this application.

With development of display technologies, liquid crystal display technologies have been widely applied in various display devices. As shown in FIG. 1, a main structure of a liquid crystal display apparatus includes a frame 1, a cover glass 2, a display panel 3, a backlight module 4, a circuit board 5, and another electronic accessory including a camera and the like. The display panel 3 includes an array substrate 300, a counter substrate 400, a liquid crystal layer 500 disposed between the array substrate 300 and the counter substrate 400, an upper polarizer, and a lower polarizer. The array substrate 300 and the counter substrate 400 are mated together by using a sealant, to restrict the liquid crystal layer 500 in a region enclosed by the sealant. When a color filter layer is disposed on the counter substrate 400, the counter substrate 400 is a color filter substrate.

A longitudinal section of the frame 1 is in a U shape. The display panel 3, the backlight module 4, the circuit board 5, and the another electronic accessory including a camera and the like are disposed in the frame 1. The backlight module 4 is located below the display panel 3. The circuit board 5 is located between the backlight module 4 and the frame 1. The cover glass 2 is located on a side that is of the display panel 3 and that is away from the backlight module 4.

To meet a consumer requirement for a narrow-frame and full-screen display apparatus, in this application, a front-facing camera is disposed at a position that is opposite to a transparent region in a display region of the display panel 3. However, in this design, light leakage needs to be further avoided, to prevent a light ray from entering the transparent region and affecting a display effect and prevent a light ray from entering the front-facing camera and affecting imaging of the camera.

On this basis, this application provides a display component, including a display panel 3 and a backlight module 4 that is located on a side that is of the display panel 3 and that is away from a light emergent surface. The display panel 3 includes an array substrate 300 and a counter substrate 400.

Figure 2A:
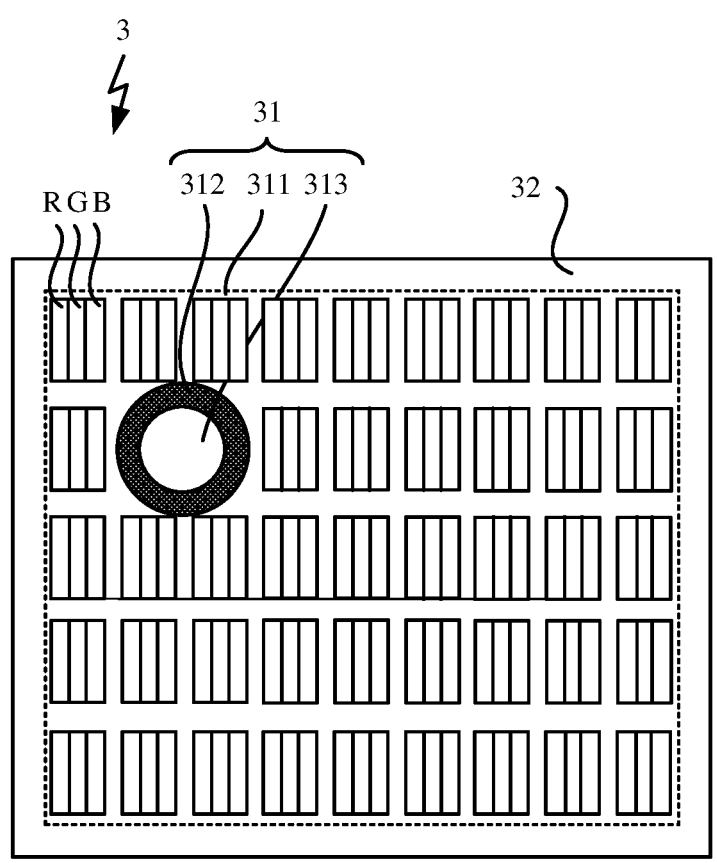
FIG. 2a is a schematic top view of a display panel according to this application.
Figure 2B:
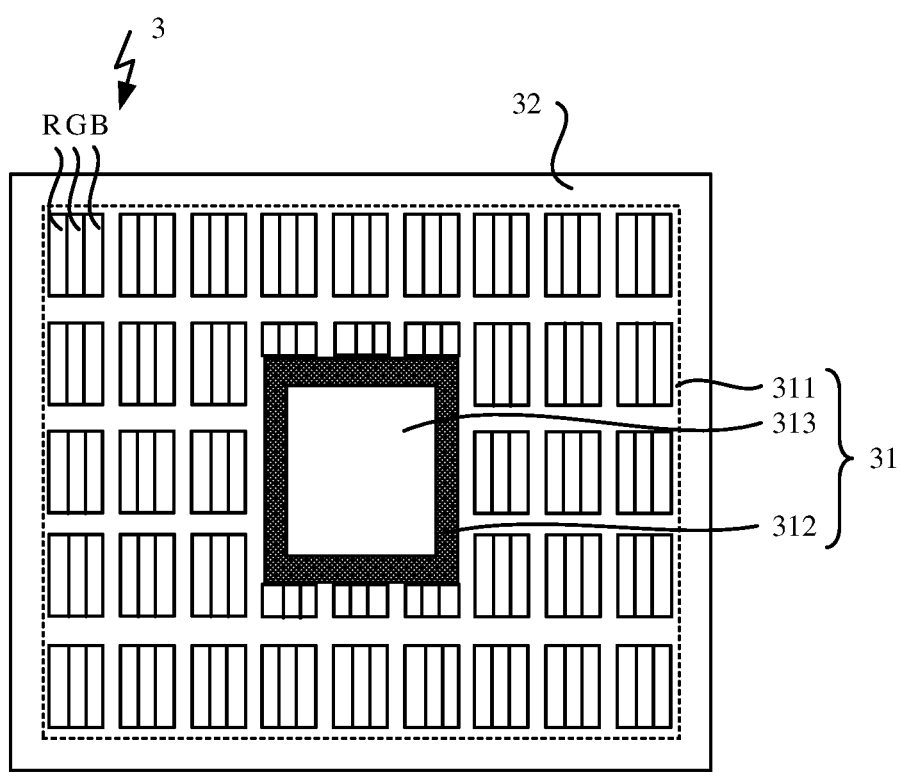
FIG. 2b is a schematic top view of another display panel according to this application.

As shown in FIG. 2a and FIG. 2b, the display panel 3 includes a display region 31. The display region 31 includes a pixel region 311, a transparent region 313, and a light shielding region 312 located between the pixel region 311 and the transparent region 313. The light shielding region 312 is disposed around the transparent region 313.

Figure 3A:
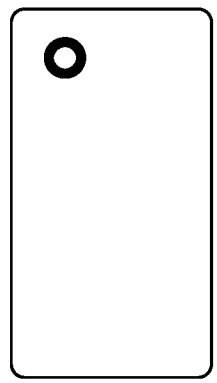
FIG. 3a is a schematic front view of a mobile phone according to this application.
Figure 3B:
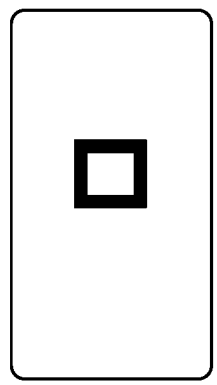
FIG. 3b is a schematic front view of another mobile phone according to this application.

A shape of the transparent region 313 may be a circle shown in FIG. 2a. In this case, an example in which the display component is applied to a mobile phone is used. A front face of the mobile phone is, for example, shown in FIG. 3a. The shape of the transparent region 313 may alternatively be a rectangle shown in FIG. 2b. In this case, an example in which the display component is applied to a mobile phone is used. A front face of the mobile phone is shown in FIG. 3b. Certainly, the shape of the transparent region 313 may alternatively be another regular shape, and the transparent region 313 may be disposed at any position in the display region 31. It should be noted that in FIG. 2a and FIG. 3a, an example in which an outer edge that is of the light shielding region 312 and that is away from the transparent region 313 is a circle is used for illustration, and in FIG. 2b and FIG. 3b, an example in which the outer edge that is of the light shielding region 312 and that is away from the transparent region 313 is a rectangle is used for illustration. However, this application is not limited thereto. A shape of the light shielding region 312 may be set according to the shape of the transparent region 313.

The display panel 3 further includes a peripheral region 32. In FIG. 2a and FIG. 2b, an example in which the peripheral region 32 surrounds the display region 31 is used for illustration. The peripheral region 32 is used for wiring, or a gate drive circuit may be disposed in the peripheral region 32.

Figure 4A:
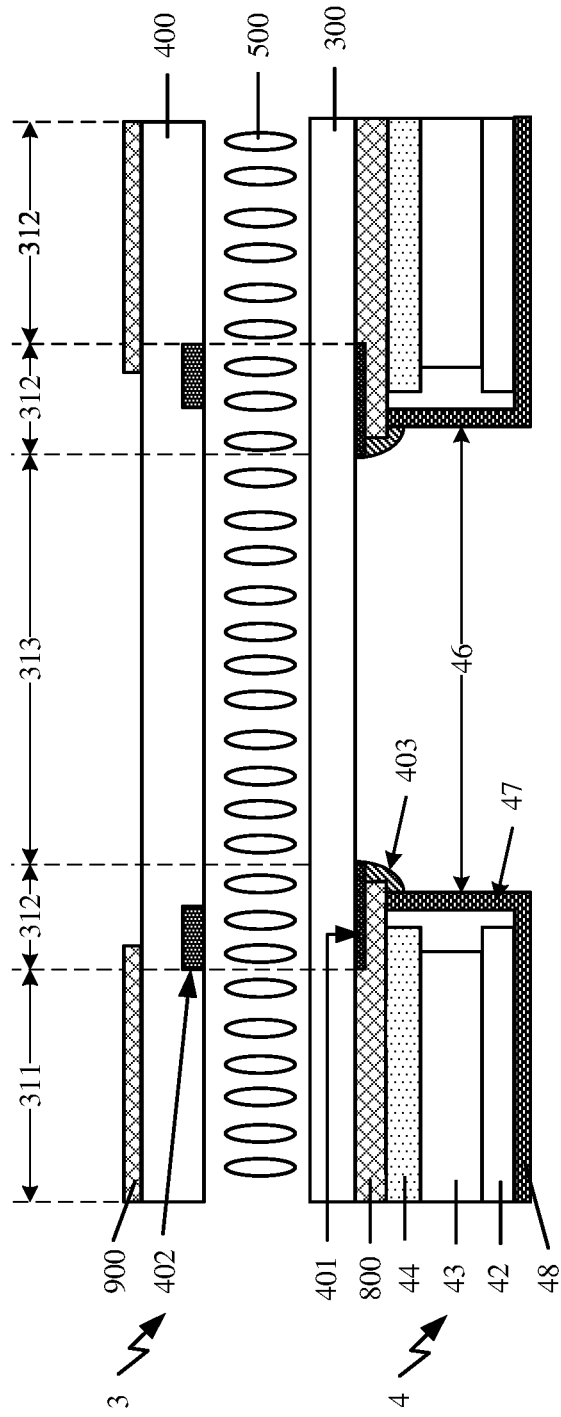
FIG. 4a is a schematic structural diagram of a display component according to this application.
Figure 4B:
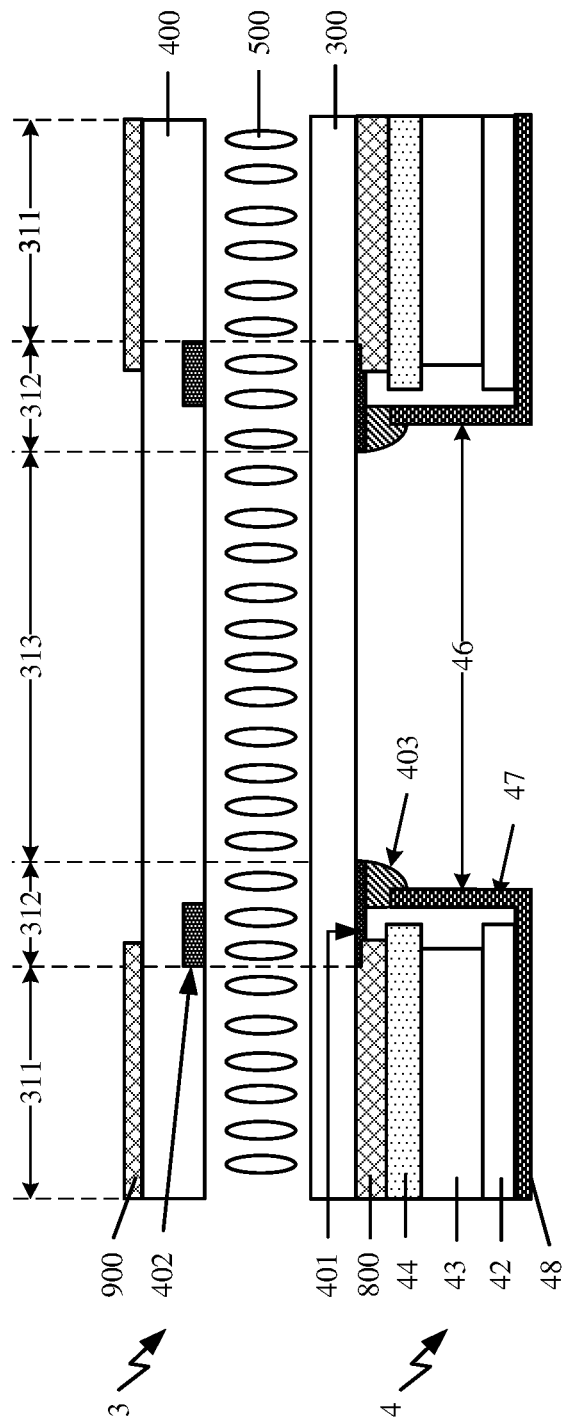
FIG. 4b is a schematic structural diagram of another display component according to this application.

As shown in FIG. 4a and FIG. 4b, a first light shielding pattern 401 located in the light shielding region 312 is disposed on a side that is of the array substrate 300 and that is away from the counter substrate 400, and the first light shielding pattern 401 is disposed around the transparent region 313.

The first light shielding pattern 401 may be in any shape. For example, when the shape of the transparent region 313 is a circle, the first light shielding pattern 401 is a circular ring, or may be two spaced circular rings. In a thickness direction of the display component, thicknesses of the first light shielding pattern 401 may be equal shown in FIG. 4a, or may not be equal shown in FIG. 4b. The thicknesses of the first light shielding pattern 401 are less than 10 nm, for example, may range from 3 nm to 6 nm. When the first light shielding pattern 401 is disposed with thicknesses that are not equal, an included angle between adjacent sides of a portion that is in a longitudinal section of the first light shielding pattern 401 and that is located on a side of the transparent region 313 may be any shape such as a right angle, a triangle, or a fillet, for example, may be shown in FIG. 17a, FIG. 17b, FIG. 17c, FIG. 17d, and FIG. 17e.

On this basis, a second light shielding pattern 402 located in the light shielding region 312 is disposed on the counter substrate 400, and the second light shielding pattern 402 is disposed around the transparent region 313. The second light shielding pattern 402 may be in any shape. In the thickness direction of the display component, thicknesses of the second light shielding pattern 402 may be equal or not equal.

Materials of the first light shielding pattern 401 and the second light shielding pattern 402 include, but are not limited to, ink, adhesive, glue, and the like.

On this basis, the backlight module 4 has a first hollow-out region 46, the first hollow-out region 46 is defined by a side frame 47 of the backlight module 4, and the side frame 47 is opaque. In the thickness direction of the display component, an edge of the first hollow-out region 46 is located in the light shielding region 312. On this basis, a person skilled in the art should understand that the edge of the first hollow-out region 46 is located between an inner edge that is of the light shielding region 312 and that is close to the transparent region 313 and an outer edge that is of the light shielding region 312 and that is close to the pixel region 311. When the display component and the front-facing camera are assembled, the front-facing camera may be embedded in the first hollow-out region 46, to reduce a thickness of the display apparatus. Therefore, a size of the first hollow-out region 46 may be slightly greater than that of the transparent region 313. Certainly, the edge of the first hollow-out region 46 may alternatively overlap with an edge of the transparent region 313.

As shown in FIG. 4a and FIG. 4b, the display component further includes a third light shielding pattern 403. The third light shielding pattern 403 is located in the light shielding region 312 and is in contact with both the display panel 3 and the side frame 47. The third light shielding pattern 403 is disposed around the transparent region 313, and is configured to absorb light that leaks from a side that is of the side frame 47 and that is close to the display panel 3. A material of the third light shielding pattern 403 includes, but is not limited to, ink, adhesive, glue, and the like.

As can be seen, the first light shielding pattern 401 and the third light shielding pattern 403 are mainly configured to absorb light emitted from the backlight module 4 to the light shielding region 312 and the transparent region 313. The second light shielding pattern 402 is mainly configured to absorb light that passes through the liquid crystal layer 500 and then is emitted to the light shielding region 312.

To completely isolate light by using the light shielding region 312 and avoid light leakage to the transparent region 313, a region obtained after projections of the first light shielding pattern 401, the second light shielding pattern 402, and the third light shielding pattern 403 are superimposed in the thickness direction of the display component is located in the entire light shielding region 312. To be specific, an inner edge and an outer edge of the region obtained after the projections of the first light shielding pattern 401, the second light shielding pattern 402, and the third light shielding pattern 403 are superimposed respectively overlap with the inner edge that is of the light shielding region 312 and that is close to the transparent region 313 and the outer edge that is of the light shielding region 312 and that is close to the pixel region 311.

On this basis, in the thickness direction of the display component, the projection of the first light shielding pattern 401 may be located in only a part of the light shielding region 312, and/or the projection of the second light shielding pattern 402 may be located in only a part of the light shielding region 312, and/or the projection of the third light shielding pattern 403 may be located in only a part of the light shielding region 312. Certainly, alternatively, in the thickness direction of the display component, the projection of the first light shielding pattern 401 may be located in the entire light shielding region 312, that is, the projection of the first light shielding pattern 401 overlaps with the light shielding region 312, and/or the projection of the second light shielding pattern 402 may be located in the entire light shielding region 312, that is, the projection of the second light shielding pattern 402 overlaps with the light shielding region 312. Specifically, the foregoing various cases may be combined. This is not limited herein.

A person skilled in the art should understand that, as shown in FIG. 2a and FIG. 2b, a plurality of pixels are disposed in the pixel region 311, and each pixel includes at least a red subpixel R, a green subpixel G, and a blue subpixel B.

The transparent region 313 is transparent and can allow an external light ray to enter, and the transparent region 313 is not used for display. The transparent region 313 may be in any shape. This is not limited in this application.

Figure 5:
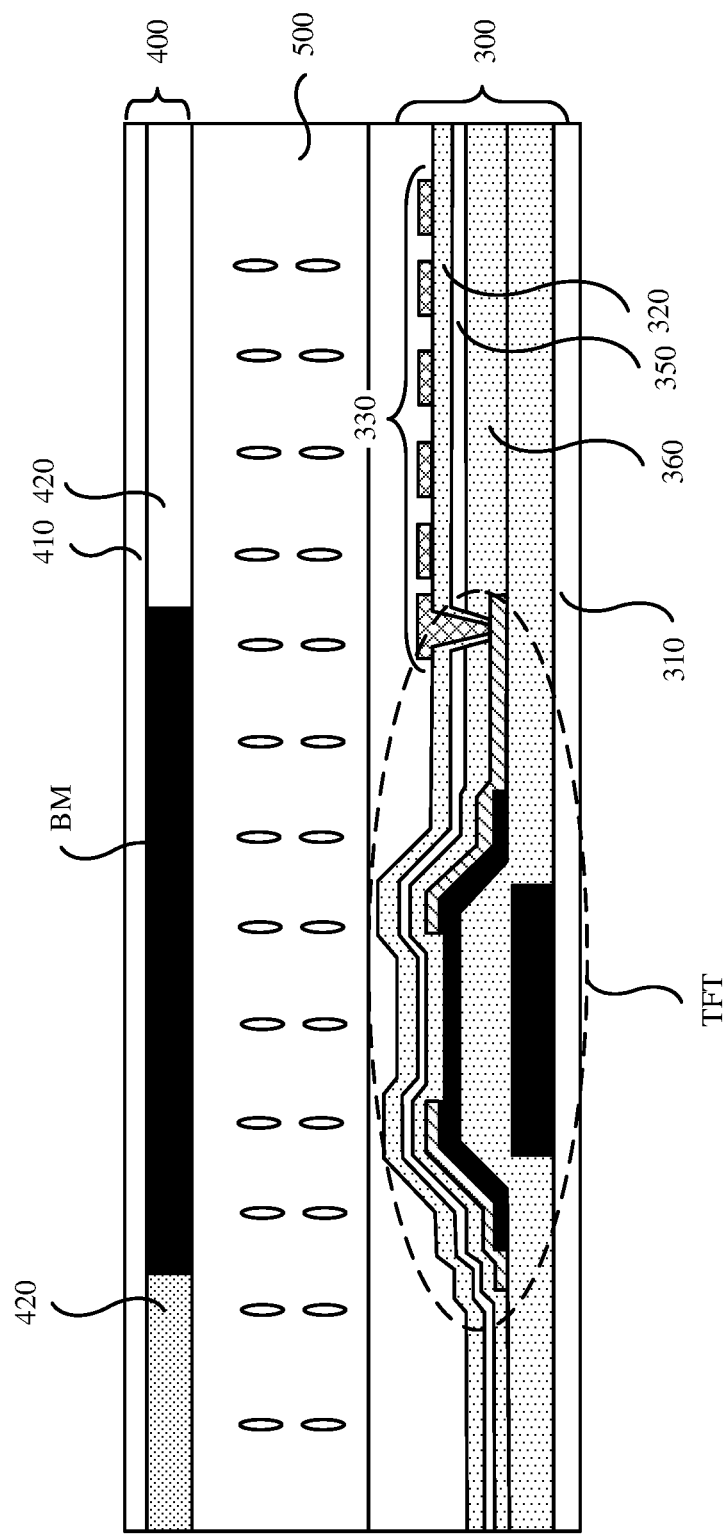
FIG. 5 is a schematic structural diagram of an array substrate of a display panel according to this application.

Optionally, a thin film transistor (Thin Film Transistor, TFT) circuit layer and a pixel electrode layer are disposed on a side that is of the first substrate 310 of the array substrate 300 and that is close to the counter substrate 400. The TFT circuit layer includes a TFT, and the pixel electrode layer includes a pixel electrode. For example, as shown in FIG. 5, a TFT and a pixel electrode 330 that is electrically connected to a drain (or a source) electrode of the TFT are disposed at a position that is on the first substrate 310 of the array substrate 300 and that is in each subpixel region. On this basis, a common electrode 350 may be further disposed on the array substrate 300. To conveniently supply power to the common electrode 350, common electrodes 350 located in all subpixels may be connected as a whole. The TFT, the pixel electrode 330, and the common electrode 350 are all disposed on a side that is of the first substrate 310 and that faces the counter substrate 400.

In FIG. 5, the common electrode 350 is located between the TFT and the pixel electrode 330 for illustration. In this case, the common electrode 350 and the pixel electrode 330 are isolated from each other by using a first insulation layer 320. In addition, a second insulation layer 360 may also be disposed between the TIFT and the common electrode 350. On this basis, the pixel electrode 330 is electrically connected to the drain electrode of the TFT through channels located on the first insulation layer 320, the common electrode 350, and the second insulation layer 360. Both the entire first insulation layer 320 and the entire second insulation layer 360 are laid in the display region 31. The first insulation layer 320 needs to be removed from a region, or the second insulation layer 360 needs to be removed from the region, or the first insulation layer 320 and the second insulation layer 360 need to be removed from the region by using a method such as perforation only when necessary.

Certainly, the common electrode 350 may also be disposed on a side that is of the pixel electrode 330 and that is away from the TFT. In this case, the common electrode 350 and the pixel electrode 330 may also be isolated from each other by using the first insulation layer 320.

Optionally, as shown in FIG. 5, a color filter (color filter, CF) layer 420 is disposed at a position that is on a second substrate 410 of the counter substrate 400 and that is in each subpixel region. The color filter layer 420 located in a red subpixel R region is a red filter layer, the color filter layer 420 located in a green subpixel G region is a green filter layer, and the color filter layer 420 located in a blue subpixel B region is a blue filter layer. In this case, the counter substrate 400 is a color filter substrate.

A material of each of the red filter layer, the green filter layer, and the blue filter layer includes a hybrid material made of a polymer material and an organic dye. A material difference between the red filter layer, the green filter layer, and the blue filter layer lies in that organic dyes are different.

Figure 6:
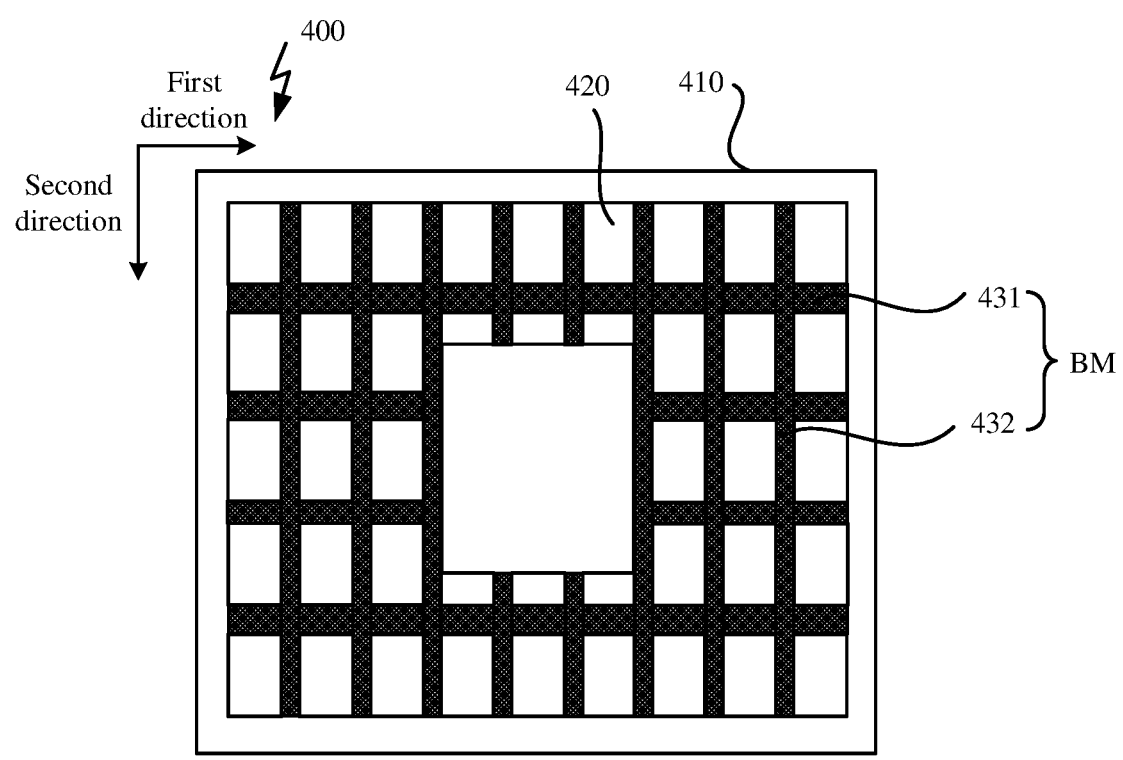
FIG. 6 is a schematic top view of a counter substrate of a display panel according to this application.

In addition, to avoid crosstalk of primary-color light emitted by adjacent subpixels, as shown in FIG. 5, a black matrix (BM) is further disposed on the counter substrate 400. As shown in FIG. 6, in the pixel region 311, the BM includes a plurality of first light shielding strips 431 extending in a first direction and a plurality of second light shielding strips 432 extending in a second direction. Both the first light shielding strips 431 and the second light shielding strips 432 are located between adjacent subpixels. The first direction and the second direction are respectively a row direction and a column direction of subpixel arrangement. For example, the first direction is a horizontal direction, and the second direction is a vertical direction.

Both the color filter layer 420 and the BM are disposed on a side that is of the counter substrate 400 and that faces the array substrate 300.

Optionally, to simplify fabrication, the second light shielding pattern 402 and the BM may be at a same layer and may be made of a same material, that is, the second light shielding pattern 402 and the BM may be fabricated through a same image composition process. The image composition process includes photolithography and etching processes. In this case, the second light shielding pattern 402 and the BM are made of a same material.

Certainly, the second light shielding pattern 402 and the BM may be disposed independently. In this case, the second light shielding pattern 402 and the BM may be made of a same material or different materials.

Optionally, as shown in FIG. 4a and FIG. 4b, the backlight module 4 includes a light source, a reflector plate 42, a light guide plate 43, and an optical film 44 that is disposed on a light emergent side of the light guide plate 43. The optical film 44 may include a diffusion plate and/or a bright enhance film, or the like. When the optical film 44 includes a diffusion plate and a bright enhance film, the diffusion plate is disposed on the light outlet side of the light guide plate 43, and the bright enhance film is disposed on a side that is of the diffusion plate and that is away from the light guide plate 43. The bright enhance film may include a brightness enhancement film (BEF) and a dual brightness enhancement film (DBEF), which may be used in combination with each other.

The reflector plate 42, the light guide plate 43, and the optical film 44 may be successively stacked on a bottom plate 48. The reflector plate 42, the light guide plate 43, the optical film 44, and the bottom plate 48 are all perforated in the first hollow-out region 46. The side frame 47 is connected to an edge that is of the bottom plate 48 and that is at a perforation position. A material of the side frame 47 may be a metal or an alloy, to prevent a light ray from being emitted from a side face of the backlight module 4.

Figure 7A:
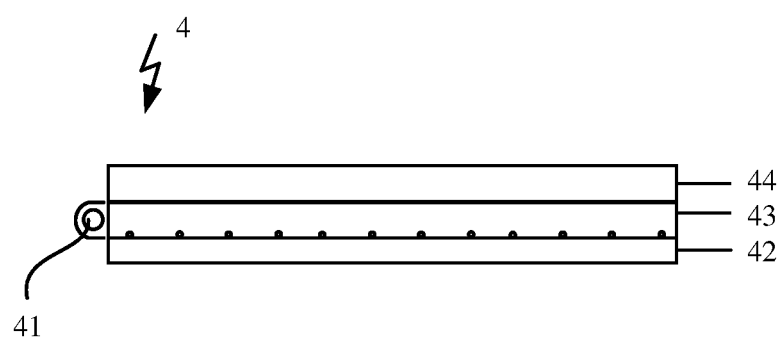
FIG. 7a is a schematic structural diagram of an edge-type backlight module according to this application.
Figure 7B:
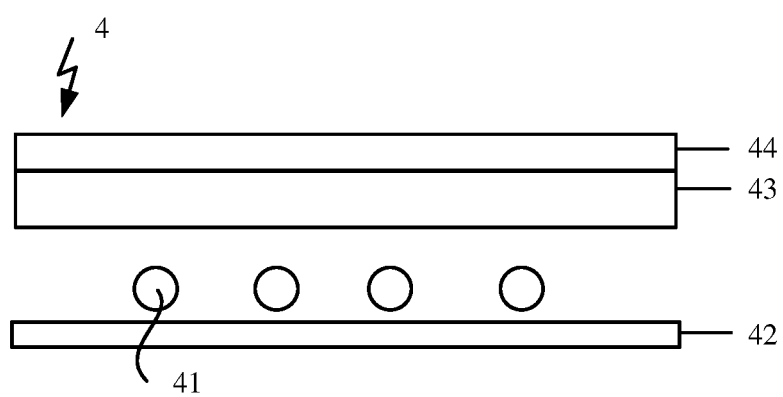
FIG. 7b is a schematic structural diagram of a direct-type backlight module according to this application.

As shown in FIG. 7a, a light source 41 may be disposed on a side face of the light guide plate 43. In this case, the backlight module 4 is an edge-type backlight module. As shown in FIG. 7b, the light source 41 may also be disposed on a side that is of the light guide plate 43 and that is away from the light emergent side. In this case, the backlight module 4 is a direct-type backlight module. The light source 41 may be, for example, a light-emitting diode (LED). Structures of the backlight module 4 in FIG. 7a and FIG. 7b are only for an illustrative purpose and constitute no limitation.

In this application, no adhesive frame is disposed between the side frame 47 and the reflector plate 42, the light guide plate 43, or the optical film 44. The adhesive frame mainly functions to bond the backlight module 4 and the display panel 3 to fasten the backlight module 4 and the display panel 3. In this application, because the third light shielding pattern 403 is in contact with both the display panel 3 and the side frame 47, and a material of the third light shielding pattern 403 may be ink, adhesive, glue, or the like, the backlight module 4 and the display panel 3 may be fastened by using the third light shielding pattern 403, and the adhesive frame is removed. Therefore, a part of space can be saved and a ratio of the light shielding region 312 can be reduced.

In the display component provided in this application, the display region 31 of the display panel 3 is divided into the pixel region 311, the transparent region 313, and the light shielding region 312 located between the pixel region 311 and the transparent region 313, and the first light shielding pattern 401 is disposed on the array substrate 300 and in correspondence with the light shielding region 312, so that light emitted from the pixel region 311 to the transparent region 313 can be absorbed, to alleviate light leakage and dispose a front-facing camera in the display region 31. On this basis, the second light shielding pattern 402 is disposed on the counter substrate 400 of the display panel 3 and in correspondence with the light shielding region 312, and the third light shielding pattern 403 that is in contact with both the display panel 3 and the side frame 47 of the backlight module 4 is disposed in correspondence with the light shielding region 312. This can ensure that the light shielding region 312 isolates a light ray between the transparent region 313 and the pixel region 311, and avoid light leakage from the pixel region 311 to the transparent region 313, thereby ensuring a display effect and an imaging effect of the front-facing camera. In addition, the third light shielding pattern 403 is disposed, so that the adhesive frame that is in the backlight module 4 and that is located between the side frame 47 and the reflector plate 42, the light guide plate 43, or the optical film 44 can be removed in this application, so that a ratio of the light shielding region 312 can be reduced.

When the front-facing camera is disposed as a telescopic structure (the front-facing camera extends out when the front-facing camera works, and retracts when the front-facing camera does not work), a size of a device is relatively large in a thickness direction, and dust-proof and drop-proof reliability or the like is relatively poor. In comparison, this problem can be avoided in this application. Compared with that a notch is provided on a screen for a front-facing camera feature, no notch needs to be provided in this application, and therefore a screen-to-body ratio is relatively high.

The display component in this application may be applied to a mobile phone terminal, or may be applied to another terminal having a display screen, such as a watch, a tablet computer, a display, and a wearable device.

Figure 8A:
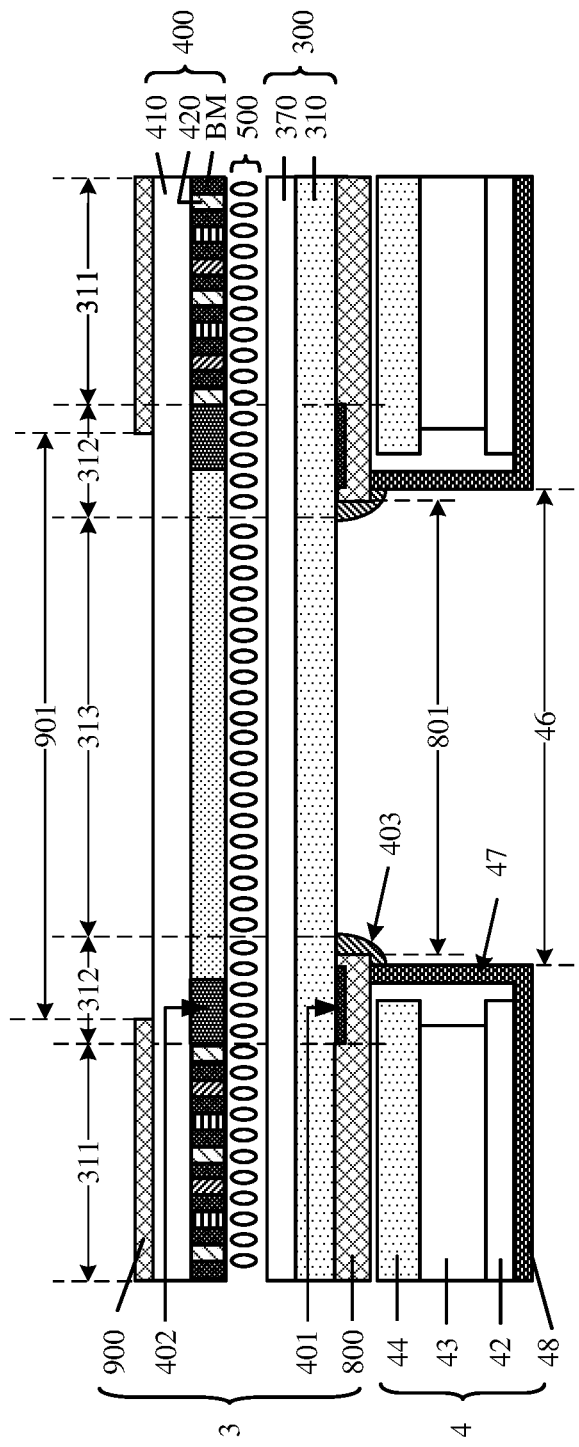
FIG. 8a is a schematic structural diagram of another display component according to this application.
Figure 8B:
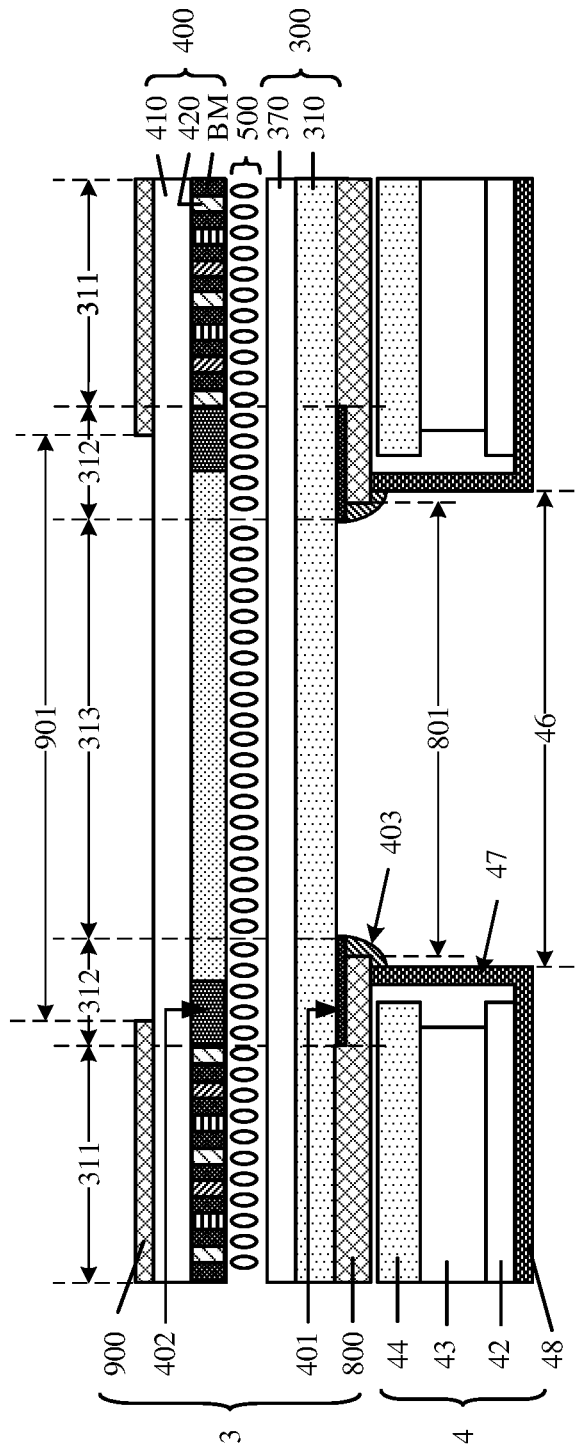
FIG. 8b is a schematic structural diagram of another display component according to this application.

Optionally, as shown in FIG. 8a and FIG. 8b, the side frame 47 is in contact with the display panel 3. The third light shielding pattern 403 is disposed on a side that is of the side frame 47 and that is close to the first hollow-out region 46.

Optionally, as shown in FIG. 11, FIG. 12, FIG. 13, and FIG. 15, there is a gap between the side frame 47 and the display panel 3. The third light shielding pattern 403 is disposed at least in the gap between the side frame 47 and the display panel 3.

When there is a gap between the side frame 47 and the display panel 3, on one hand, the third light shielding pattern 403 is filled in the gap and absorbs a light ray emitted by the backlight module 4 to the gap between the side frame 47 and the display panel 3. On the other hand, a bonding area of the third light shielding pattern 403 is increased, so that the side frame 47 and the display panel 3 are more securely connected.

Optionally, as shown in FIG. 8a, FIG. 8b, and FIG. 9 to FIG. 15, a lower polarizer 800 is further disposed on the array substrate 300, and the lower polarizer 800 has a second hollow-out region 801. To improve light transmission of the transparent region 313, in the thickness direction of the display component, a projection of a side face that is of the lower polarizer 800 and that defines the second hollow-out region 801 (that is, an edge of the second hollow-out region 801) is located in the light shielding region 312.

In the thickness direction of the display component, the projection of the side face that is of the lower polarizer 800 and that defines the second hollow-out region 801 is located in the light shielding region 312. To be specific, the projection of the side surface that is of the lower polarizer 800 and that defines the second hollow-out region 801 is located between the inner edge that is of the light shielding region 312 and that is close to the transparent region 313 and the outer edge that is of the light shielding region 312 and that is close to the pixel region 311, to ensure a display effect of the transparent region 313.

On this basis, in the thickness direction of the display component, the projection of the side face that is of the lower polarizer 800 and that defines the second hollow-out region 801 may overlap with an edge of the transparent region 313; or the projection of the side face that is of the lower polarizer 800 and that defines the second hollow-out region 801 is located on a side that is of an edge of the transparent region 313 and that is close to the light shielding region 312.

For example, during actual fabrication, in the thickness direction of the display component, the side face that is of the lower polarizer 800 and that defines the second hollow-out region 801 may be disposed opposite to any position between an inner side face that is of the first light shielding pattern 401 and that is close to the transparent region 313 and an outer side face that is of the first light shielding pattern 401 and that is close to the pixel region 311. Alternatively, the side face that is of the lower polarizer 800 and that defines the second hollow-out region 801 may be disposed opposite to any position between an inner side surface that is of the second light shielding pattern 402 and that is close to the transparent region 313 and an outer side surface that is of the second light shielding pattern 402 and that is close to the pixel region 311.

Optionally, the lower polarizer 800 is a conventional polarizer, or may be a gridpolarizer (GP).

When the lower polarizer 800 is a wire-grid polarizer, a material of the wire-grid polarizer may be a metal. The wire-grid polarizer may be directly fabricated on the first substrate 310 through sputtering, nano-imprinting, photolithography, or the like. The material of the wire-grid polarizer includes, but is not limited to, aluminum (Al), copper (Cu), silver (Ag), gold (Au), chromium (Cr), or the like.

When the lower polarizer 800 is a wire-grid polarizer, the wire-grid polarizer may be formed on a side that is of the first substrate 310 and that faces the counter substrate 400, or may be formed on a side that is of the first substrate 310 and that is away from the counter substrate 400. When the lower polarizer 800 is a conventional polarizer, the lower polarizer 800 is formed on the side that is of the first substrate 310 and that is away from the counter substrate 400.

Optionally, as shown in FIG. 8a, FIG. 8b, and FIG. 9 to FIG. 15, the lower polarizer 800 is disposed on a side that is of the first substrate 310 and that is close to the backlight module 4, so that fabrication is easier.

Optionally, as shown in FIG. 8a, FIG. 8b, and FIG. 9 to FIG. 15, an upper polarizer 900 is further disposed on the counter substrate 400, and the upper polarizer 900 has a third hollow-out region 901. In the thickness direction of the display component, a projection of a side face that is of the upper polarizer 900 and that defines the third hollow-out region 901 (that is, an edge of the third hollow-out region 901) is located in the light shielding region 312.

Similar to the lower polarizer 800, the projection of the side surface that is of the upper polarizer 900 and that defines the third hollow-out region 901 is located between the inner edge that is of the light shielding region 312 and that is close to the transparent region 313 and the outer edge that is of the light shielding region 312 and that is close to the pixel region 311, to ensure a display effect of the transparent region 313. On this basis, in the thickness direction of the display component, the projection of the side face that is of the upper polarizer 900 and that defines the third hollow-out region 901 may overlap with the edge of the transparent region 313; or the projection of the side face that is of the upper polarizer 900 and that defines the third hollow-out region 901 is located on a side that is of the edge of the transparent region 313 and that is close to the light shielding region 312.

For example, during actual fabrication, the side face that is of the upper polarizer 900 and that defines the third hollow-out region 901 may be disposed opposite to any position between the inner side face that is of the first light shielding pattern 401 and that is close to the transparent region 313 and the outer side face that is of the first light shielding pattern 401 and that is close to the pixel region 311. Alternatively, the side face that is of the upper polarizer 900 and that defines the third hollow-out region 901 may be disposed opposite to any position between the inner side surface that is of the second light shielding pattern 402 and that is close to the transparent region 313 and the outer side surface that is of the second light shielding pattern 402 and that is close to the pixel region 311.

Optionally, the upper polarizer 900 is a conventional polarizer, or may be a wire-grid polarizer.

When the upper polarizer 900 is a wire-grid polarizer, the wire-grid polarizer may be formed on a side that is of the second substrate 410 and that faces the array substrate 300, or may be formed on a side that is of the second substrate 410 and that is away from the array substrate 300. When the upper polarizer 900 is a conventional polarizer, the upper polarizer 900 is formed on the side that is of the second substrate 410 and that is away from the array substrate 300. In FIG. 8a, FIG. 8b, and FIG. 9 to FIG. 15, the upper polarizer 900 is formed on the side that is of the second substrate 410 and that is away from the array substrate 300 for illustration.

On this basis, a principle of displaying in the pixel region 311 of the display component in this application is as follows: The backlight module 4 emits white light, the white light passes through the lower polarizer 800 to form polarized white light with a specific polarization direction, the polarized white light is emitted to the liquid crystal layer 500, and then is filtered by the color filter layer 420 of the counter substrate 400 to form polarized red, green, and blue light, and the polarized red, green, and blue light is emitted to the upper polarizer 900. Because a liquid crystal molecule is optical active for polarized light, a specific molecular arrangement direction may change a polarization direction of polarized light. Therefore, when an arrangement direction of a liquid crystal molecule rotates under control of an electric field, an amount of polarized light emitted from the upper polarizer 900 can be controlled, so that an amount of light output by each subpixel can be controlled to finally form a color image.

Optionally, as shown in FIG. 8a and FIG. 8b, the side frame 47 is directly in contact with the lower polarizer 800. The first light shielding pattern 401 is located between the first substrate 310 and the lower polarizer 800.

When the side frame 47 is directly in contact with the lower polarizer 800, the side face that is of the lower polarizer 800 and that defines the second hollow-out region 801 is located on a side that is of the side frame 47 and that is away from the pixel region 311, that is, the side face that is of the lower polarizer 800 and that defines the second hollow-out region 801 is located on a side of the first hollow-out region 46 of the side frame 47.

It may be understood that when the side frame 47 is directly in contact with the lower polarizer 800, this is equivalent to that the side frame 47 is in contact with the display panel 3. Therefore, the third light shielding pattern 403 is disposed on a side that is of the side frame 47 and that is close to the first hollow-out region 46. The third light shielding pattern 403 covers the side face that is of the lower polarizer 800 and that defines the second hollow-out region 801 and a bottom face of a portion that is of the lower polarizer 800 and that extends beyond the side frame 47, so that the third light shielding pattern 403 can absorb a light ray leaking from an edge that is of the lower polarizer 800 and that is close to the second hollow-out region 801. Herein, the bottom face is a face facing the backlight module 4.

Figure 18A:
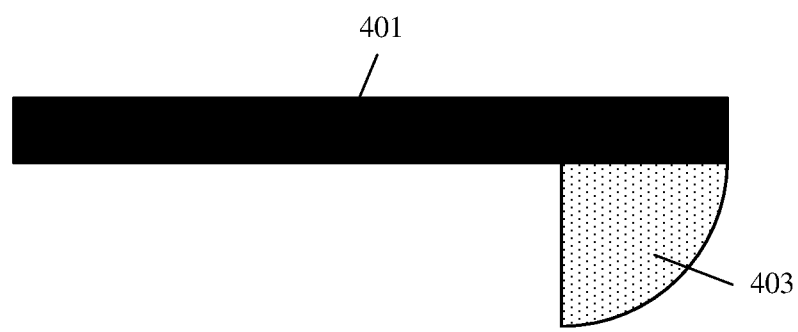
FIG. 18a is a schematic diagram of a relationship between relative positions of a third light shielding pattern and a first light shielding pattern according to this application.
Figure 18B:
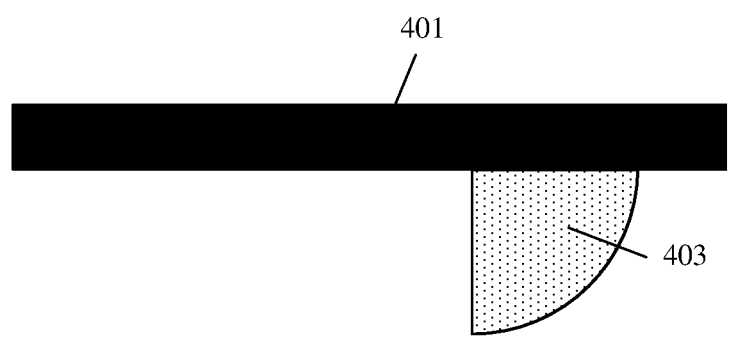
FIG. 18b is another schematic diagram of a relationship between relative positions of a third light shielding pattern and a first light shielding pattern according to this application.
Figure 18C:
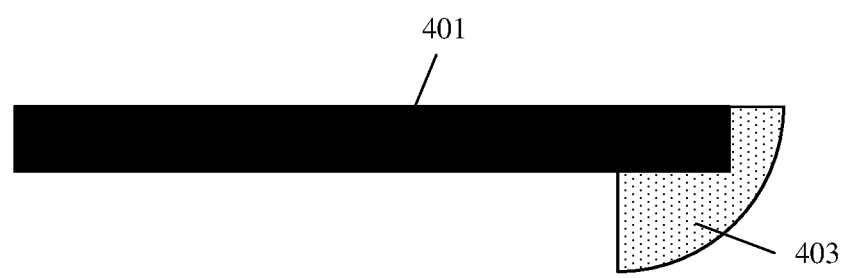
FIG. 18c is still another schematic diagram of a relationship between relative positions of a third light shielding pattern and a first light shielding pattern according to this application.

When the first light shielding pattern 401 is in contact with the third light shielding pattern 403, as shown in FIG. 18a, at least a part of a side face that is of the third light shielding pattern 403 and that is close to the first hollow-out region 46 may overlap with a side face that is of the first light shielding pattern 401 and that is close to the first hollow-out region 46. Alternatively, as shown in FIG. 18b and FIG. 18c, the side face that is of the third light shielding pattern 403 and that is close to the first hollow-out region 46 may be staggered from the side face that is of the first light shielding pattern 401 and that is close to the first hollow-out region 46. Certainly, the first light shielding pattern 401 and the third light shielding pattern 403 may also be in contact with each other in any other manner.

The first light shielding pattern 401 is disposed between the first substrate 310 and the lower polarizer 800, and the third light shielding pattern 403 covers the side surface that is of the lower polarizer 800 and that defines the second hollow-out region 801 and the bottom face that is of the lower polarizer 800 and that extends beyond the side frame 47, so that light emitted from the backlight module 4 to the light shielding region 312 and the transparent region 313 can be absorbed to a maximum extent.

On this basis, optionally, as shown in FIG. 8b, a side face that is of the first light shielding pattern 401 and that is close to the transparent region 313 extends beyond the side surface that is of the lower polarizer 800 and that defines the second hollow-out region 801, that is, a projection of the side face that is of the first light shielding pattern 401 and that is close to the transparent region 313 is located in the first hollow-out region 46. In this case, the third light shielding pattern 403 is in contact with the first light shielding pattern 401, the side face that is of the lower polarizer 800 and that defines the second hollow-out region 801, the bottom face that is of the lower polarizer 800 and that extends beyond the side frame 47, and a portion that is of the side frame 47 and that is close to a side of the first hollow-out region 46 and close to the display panel 3. In this way, a size of the first light shielding pattern 401 may be as large as possible, so that more light emitted to the light shielding region 312 and the transparent region 313 can be absorbed.

Certainly, as shown in FIG. 8a, the side face that is of the first light shielding pattern 401 and that is close to the transparent region 313 may alternatively not extend beyond the side face that is of the lower polarizer 800 and that defines the second hollow-out region 801. In this case, the third light shielding pattern 403 is in contact with the first substrate 310, the side face that is of the lower polarizer 800 and that defines the second hollow-out region 801, the bottom face that is of the lower polarizer 800 and that extends beyond the side frame 47, and the portion that is of the side frame 47 and that is close to a side of the first hollow-out region 46 and close to the display panel 3.

Figure 11:
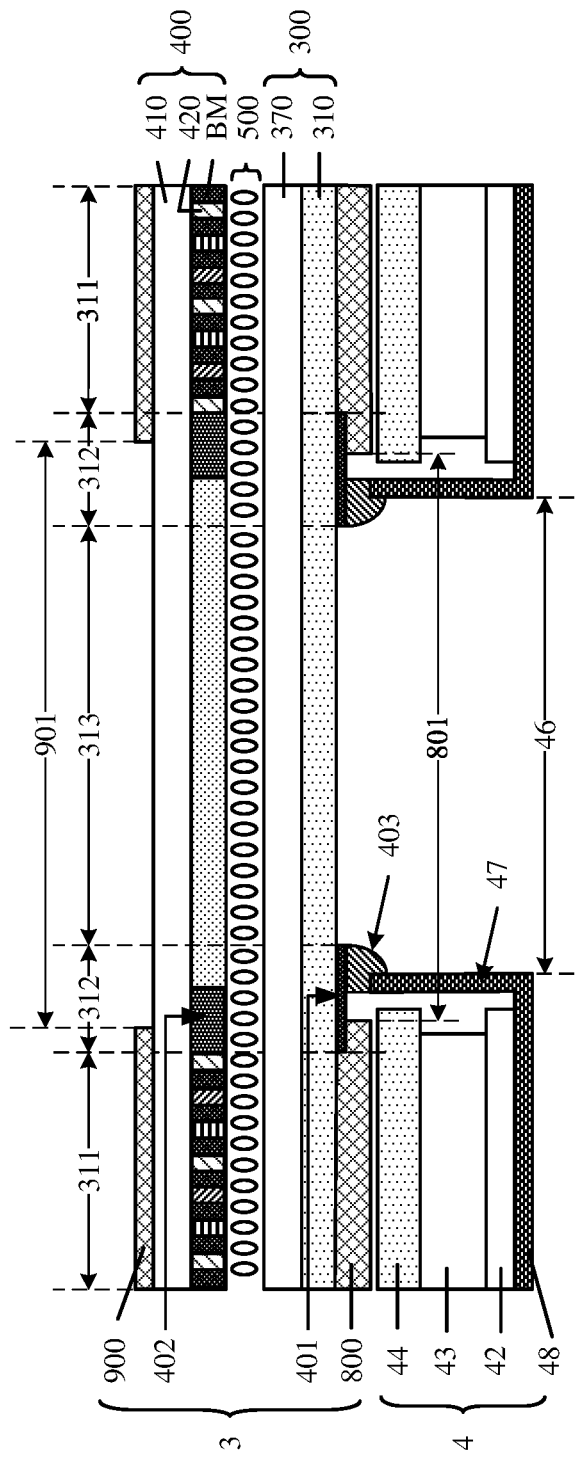
FIG. 11 is a schematic structural diagram of still another display component according to this application.
Figure 15:
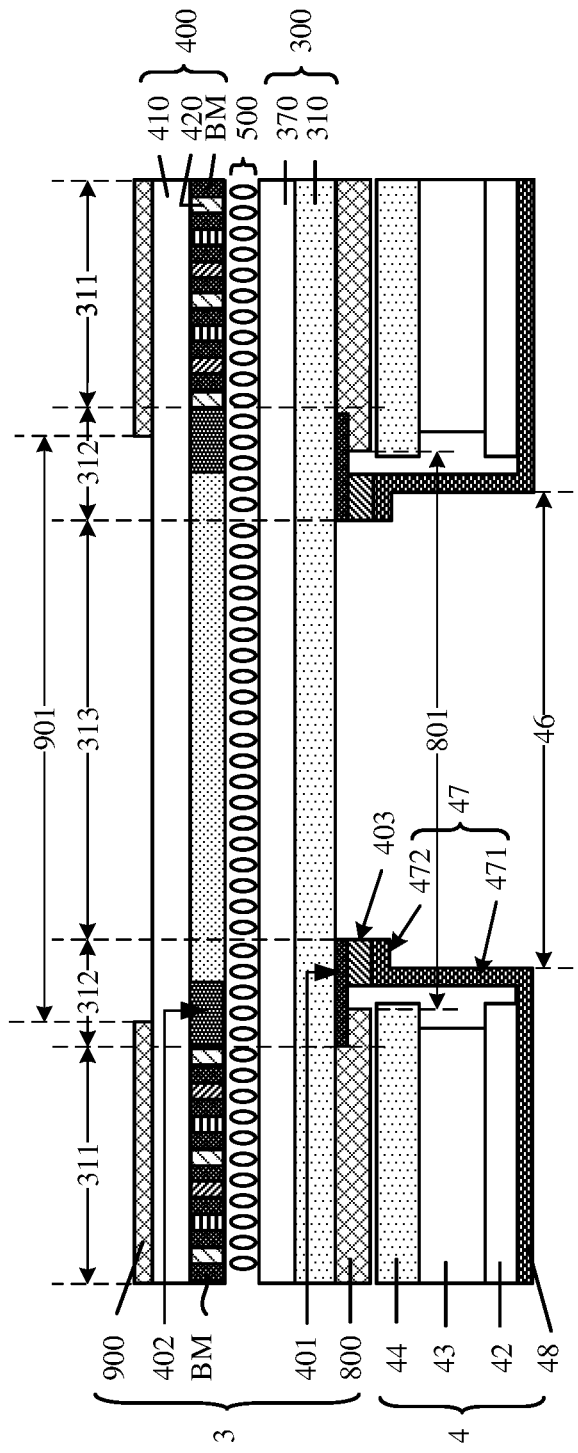
FIG. 15 is a schematic structural diagram of still another display component according to this application.

Optionally, as shown in FIG. 11 and FIG. 15, the side face that is of the lower polarizer 800 and that defines the second hollow-out region 801 is located on a side that is of the side frame 47 and that is away from the first hollow-out region 46. The first light shielding pattern 401 is located between the first substrate 310 and the lower polarizer 800 and extends at least above the side frame 47. There is a gap between the side frame 47 and the first light shielding pattern 401.

The side face that is of the lower polarizer 800 and that defines the second hollow-out region 801 is located on the side that is of the side frame 47 and that is away from the first hollow-out region 46, that is, a size of the second hollow-out region 801 is greater than that of the first hollow-out region 46.

When the side face that is of the lower polarizer 800 and that defines the second hollow-out region 801 is located on the side that is of the side frame 47 and that is away from the first hollow-out region 46, there is a gap between the side frame 47 and the first light shielding pattern 401. In this case, the third light shielding pattern 403 is disposed at least in the gap between the side frame 47 and the first light shielding pattern 401.

As shown in FIG. 18a, at least a part of the side face that is of the third light shielding pattern 403 and that is close to the first hollow-out region 46 may overlap with the side face that is of the first light shielding pattern 401 and that is close to the first hollow-out region 46. Alternatively, as shown in FIG. 18b and FIG. 18c, the side face that is of the third light shielding pattern 403 and that is close to the first hollow-out region 46 may be staggered from the side face that is of the first light shielding pattern 401 and that is close to the first hollow-out region 46. Certainly, the first light shielding pattern 401 and the third light shielding pattern 403 may also be in contact with each other in any other manner.

The first light shielding pattern 401 is disposed between the first substrate 310 and the lower polarizer 800 and extends at least above the side frame 47, and the third light shielding pattern 403 is disposed at least in the gap between the side frame 47 and the first light shielding pattern 401 (that is, the side frame 47 and the display panel 3), so that light emitted from the backlight module 4 to the light shielding region 312 and the transparent region 313 can be absorbed to a maximum extent.

On this basis, as shown in FIG. 11, the third light shielding pattern 403 may extend from the gap between the side frame 47 and the display panel 3 to a side that is of the side frame 47 and that is close to the first hollow-out region 46, and is in contact with a portion that is of a side face of the side frame 47 and that is close to the display panel 3. In this way, a contact area of the third light shielding pattern 403 and the side frame 47 can be further increased while a light ray is prevented from leaking out from the gap between the side frame 47 and the display panel 3, so that the display panel 3 and the backlight module 4 are better fastened.

Figure 12:
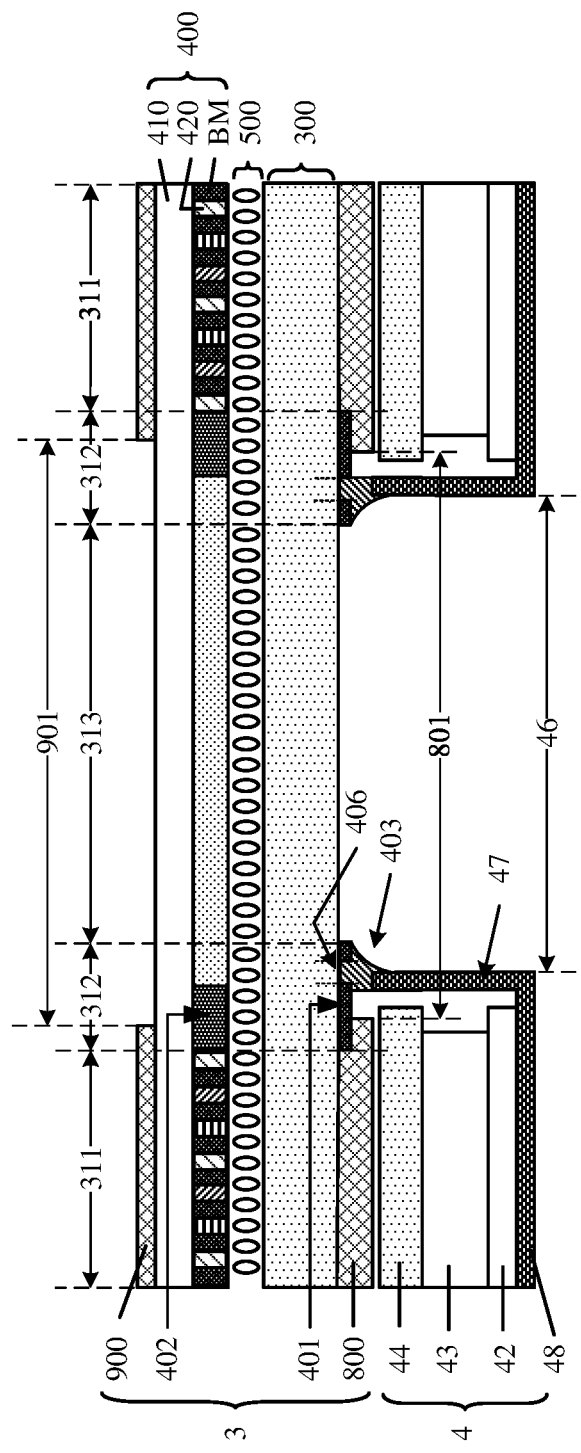
FIG. 12 is a schematic structural diagram of still another display component according to this application.

When the side face that is of the lower polarizer 800 and that defines the second hollow-out region 801 is located on the side that is of the side frame 47 and that is away from the first hollow-out region 46, and the first light shielding pattern 401 is located between the first substrate 310 and the lower polarizer 800 and extends at least above the side frame 47, optionally, as shown in FIG. 12, the first light shielding pattern 401 has a hollow-out portion 406, and the third light shielding pattern 403 is filled in the hollow-out portion 406 and is in contact with the first substrate 310.

The hollow-out portion 406 is disposed in the first light shielding pattern 401, so that the third light shielding pattern 403 can be limited and fabrication of the third light shielding pattern 403 is easier.

Optionally, as shown in FIG. 9, FIG. 10, FIG. 13, and FIG. 14, the side face that is of the lower polarizer 800 and that defines the second hollow-out region 801 is located on the side that is of the side frame 47 and that is away from the first hollow-out region 46. The first light shielding pattern 401 is located in the second hollow-out region 801 of the lower polarizer 800 and extends at least above the side frame 47.

When the first light shielding pattern 401 is in contact with the third light shielding pattern 403, as shown in FIG. 18a, at least a part of the side face that is of the third light shielding pattern 403 and that is close to the first hollow-out region 46 may overlap with the side face that is of the first light shielding pattern 401 and that is close to the first hollow-out region 46. Alternatively, as shown in FIG. 18b and FIG. 18c, the side face that is of the third light shielding pattern 403 and that is close to the first hollow-out region 46 may be staggered from the side face that is of the first light shielding pattern 401 and that is close to the first hollow-out region 46. Certainly, the first light shielding pattern 401 and the third light shielding pattern 403 may also be in contact with each other in any other manner.

When the first light shielding pattern 401 is located on a side that is of the lower polarizer 800 and that is close to the second hollow-out region 801, the first light shielding pattern 401 may be directly in contact with the lower polarizer 800 as shown in FIG. 9, FIG. 13, FIG. 14, and FIG. 16. Alternatively, there may be a gap between the first light shielding pattern 401 and the lower polarizer 800, as shown in FIG. 10. This is not specifically limited herein.

In this case, the disposed first light shielding pattern 401 can avoid light leakage that is caused because a light ray leaks from the side face that is of the lower polarizer 800 and that defines the second hollow-out region 801.

Figure 13:
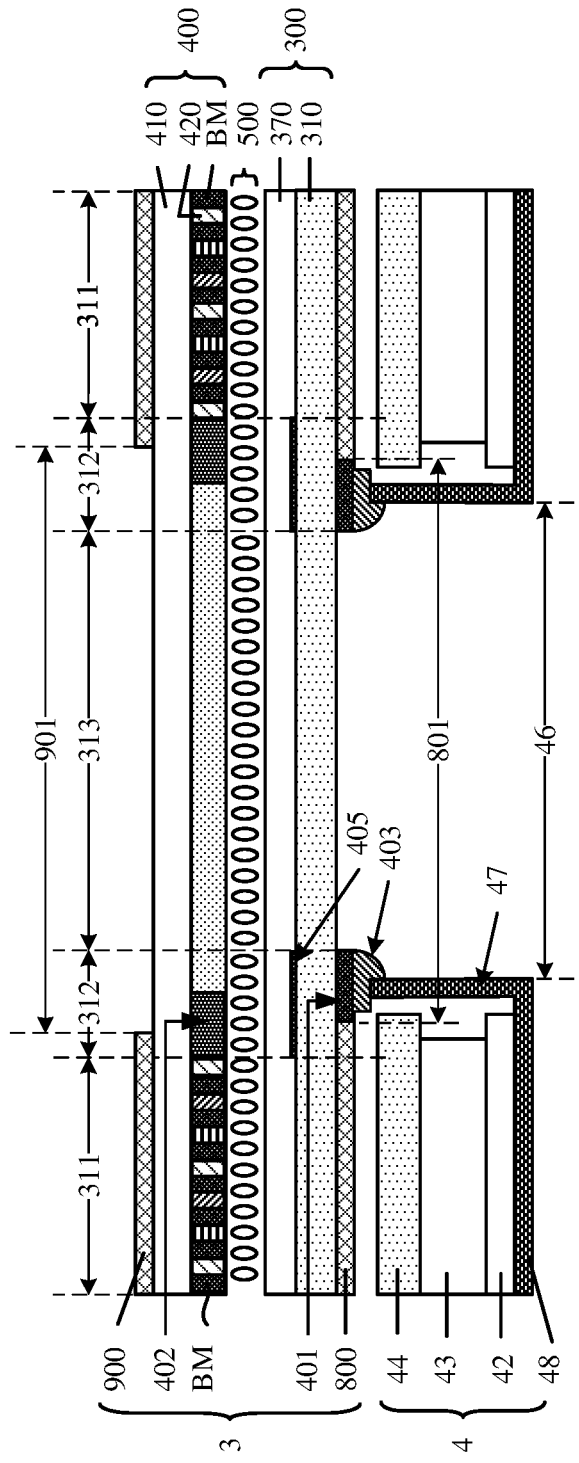
FIG. 13 is a schematic structural diagram of still another display component according to this application.
Figure 14:
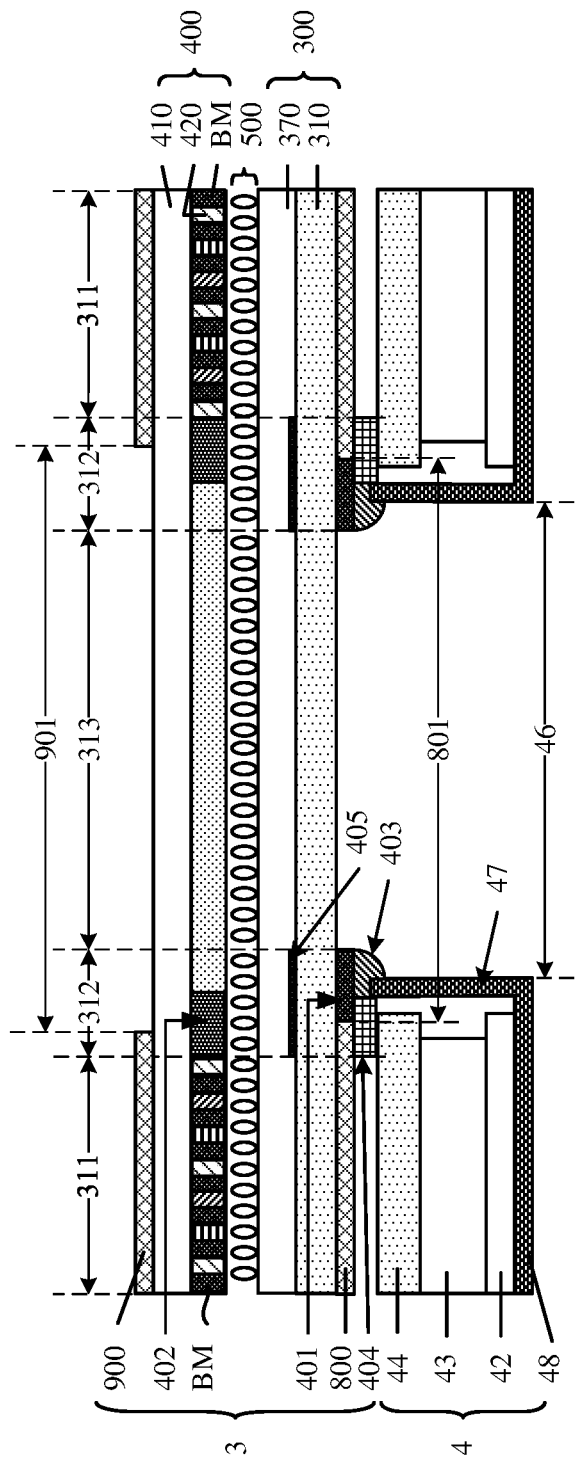
FIG. 14 is a schematic structural diagram of still another display component according to this application.

In this case, optionally, as shown in FIG. 13 and FIG. 14, the first light shielding pattern 401 is directly in contact with the lower polarizer 800, and there is a gap between the side frame 47 and the first light shielding pattern 401. In this case, the third light shielding pattern 403 is disposed at least in the gap between the side frame 47 and the first light shielding pattern 401.

The first light shielding pattern 401 is directly in contact with the lower polarizer 800, so that a size of the first light shielding pattern 401 may be comparatively large, thereby absorbing as many light rays as possible.

Optionally, as shown in FIG. 14, the display component further includes a fourth light shielding pattern 404 disposed between the display panel 3 and the backlight module 4. In the thickness direction of the display component, the fourth light shielding pattern 404 is disposed opposite to the light shielding region 312. The fourth light shielding pattern 404 is disposed around the transparent region 313. The fourth light shielding pattern 404 overlaps with a portion that is of the lower polarizer 800 and that is close to the first light shielding pattern 401 and a portion that is of the first light shielding pattern 401 and that is close to the lower polarizer 800. The fourth light shielding pattern 404 is located on the side that is of the side frame 47 and that is away from the first hollow-out region 46. The fourth light shielding pattern 404 is in contact with at least the backlight module 4, that is, the fourth light shielding pattern 404 is in contact with at least the optical film 44 of the backlight module 4.

The fourth light shielding pattern 404 cooperates with the first light shielding pattern 401, so that as many light rays can be absorbed as possible, to avoid light leakage.

When there is a gap between the side frame 47 and the first light shielding pattern 401, as shown in FIG. 13 and FIG. 14, the third light shielding pattern 403 may extend from the gap between the side frame 47 and the first light shielding pattern 401 (that is, the side frame 47 and the display panel 3) to the side that is of the side frame 47 and that is close to the first hollow-out region 46, and is in contact with a portion that is of a side face of the side frame 47 and that is close to the display panel 3. In this way, a contact area of the third light shielding pattern 403 and the side frame 47 can be further increased while a light ray is prevented from leaking out from the gap between the side frame 47 and the display panel 3, so that the display panel 3 and the backlight module 4 are better fastened.

Figure 9:
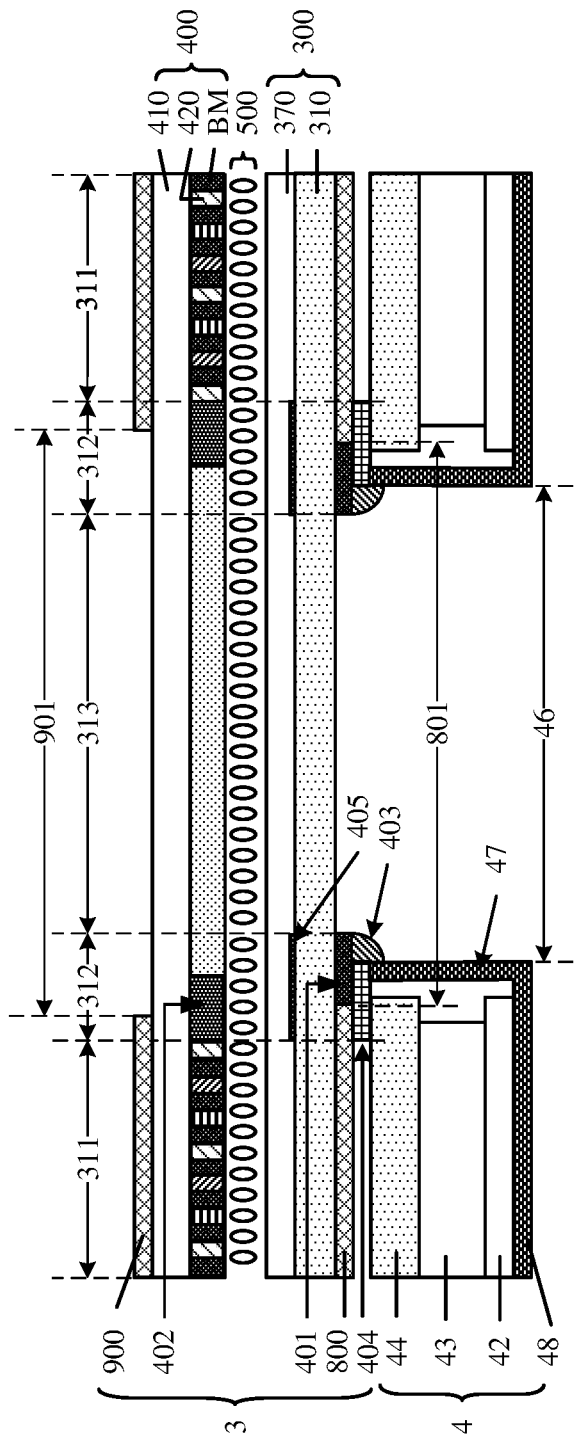
FIG. 9 is a schematic structural diagram of still another display component according to this application.
Figure 10:
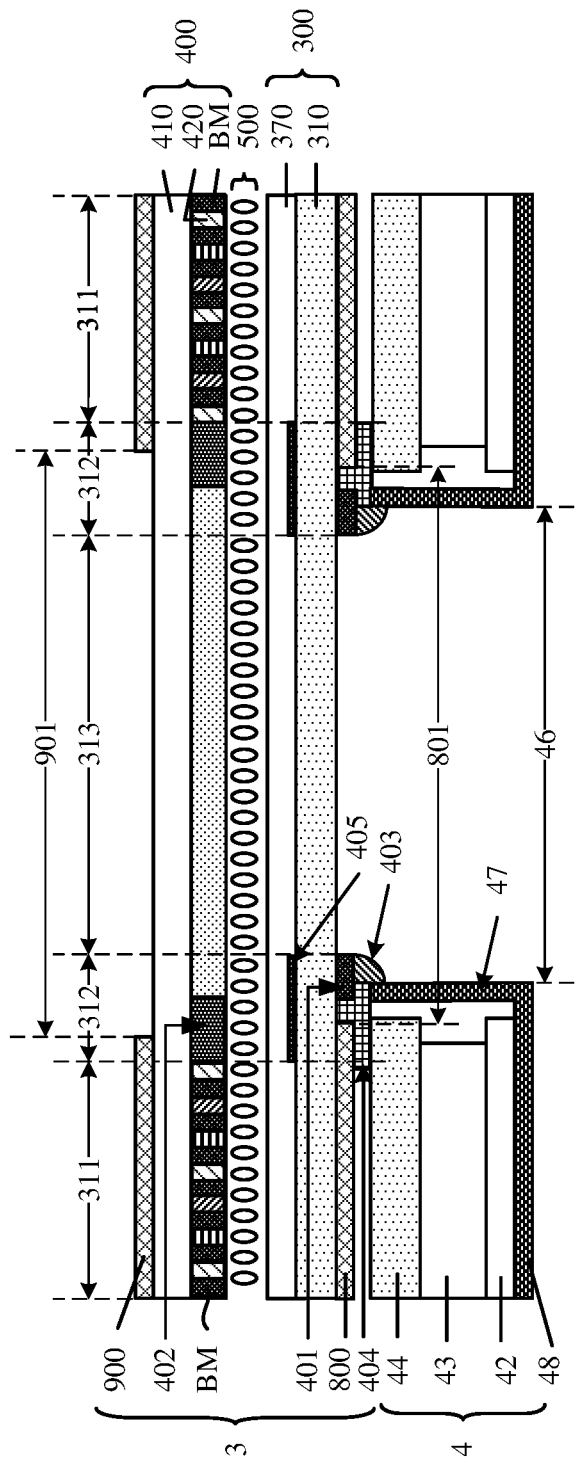
FIG. 10 is a schematic structural diagram of still another display component according to this application.

Optionally, as shown in FIG. 9 and FIG. 10, the display component further includes a fourth light shielding pattern 404 disposed between the display panel 3 and the backlight module 4. In the thickness direction of the display component, the fourth light shielding pattern 404 is disposed opposite to the light shielding region 312. The fourth light shielding pattern 404 is disposed around the transparent region 313. The fourth light shielding pattern 404 overlaps with a portion that is of the lower polarizer 800 and that is close to the first light shielding pattern 401 and a portion that is of the first light shielding pattern 401 and that is close to the lower polarizer 800. The fourth light shielding pattern 404 extends above the side frame 47 and is in contact with the side frame 47.

When the side frame 47 is in contact with the fourth light shielding pattern 404, the third light shielding pattern 403 is disposed on the side that is of the side frame 47 and that is close to the first hollow-out region 46. In this case, the third light shielding pattern 403 mainly functions to bond the display panel 3 and the backlight module 4.

A material of the fourth light shielding pattern 404 includes, but is not limited to, ink, glue, adhesive, and the like.

The fourth light shielding pattern 404 cooperates with the first light shielding pattern 401, so that as many light rays can be absorbed as possible, to avoid light leakage.

When the side face that is of the lower polarizer 800 and that defines the second hollow-out region 801 is located on the side that is of the side frame 47 and that is away from the first hollow-out region 46, and the first light shielding pattern 401 is located in the second hollow-out region 801 of the lower polarizer 800, optionally, as shown in FIG. 9, FIG. 10, FIG. 13, and FIG. 14, a fifth light shielding pattern 405 located in the light shielding region 312 is further disposed on the array substrate 300, and the fifth light shielding pattern 405 is disposed around the transparent region 313. The fifth light shielding pattern 405 is located between the first substrate 310 and a TFT circuit layer 370 that is disposed on a side that is of the first substrate 310 and that is close to the counter substrate 400 (or away from the backlight module 4), and the fifth light shielding pattern 405 covers a part of the lower polarizer 800.

Herein, because the side face that is of the lower polarizer 800 and that defines the second hollow-out region 801 is located on the side that is of the side frame 47 and that is away from the first hollow-out region 46, when the fifth light shielding pattern 405 covers the part of the lower polarizer 800, the fifth light shielding pattern 405 overlaps with a portion that is of the lower polarizer 800 and that is close to the second hollow-out region 801.

A material of the fifth light shielding pattern 405 includes, but is not limited to, ink, glue, adhesive, and the like.

Optionally, in the thickness direction of the display component, a projection of the fifth light shielding pattern 405 overlaps with the light shielding region 312, that is, the projection of the fifth light shielding pattern 405 is located in the entire light shielding region 312.

When the fifth light shielding pattern 405 is located between the first substrate 310 and the TFT circuit layer 370, during fabrication of the array substrate 300, the fifth light shielding pattern 405 is first fabricated, and then the TFT circuit layer 370 is fabricated in the pixel region 311 in a process. Therefore, the fifth light shielding pattern 405 can isolate light reflection of a TFT circuit and further enhance light shielding.

It should be noted that the first light shielding pattern 401, the second light shielding pattern 402, the third light shielding pattern 403, the fourth light shielding pattern 404, and the fifth light shielding pattern 405 may all be fabricated by using an auxiliary positioning technology such as a charge coupled device (charge coupled device, CCD), to ensure that the first light shielding pattern 401, the second light shielding pattern 402, the third light shielding pattern 403, the fourth light shielding pattern 404, and the fifth light shielding pattern 405 do not extend beyond the light shielding region 312.

Figure 16:
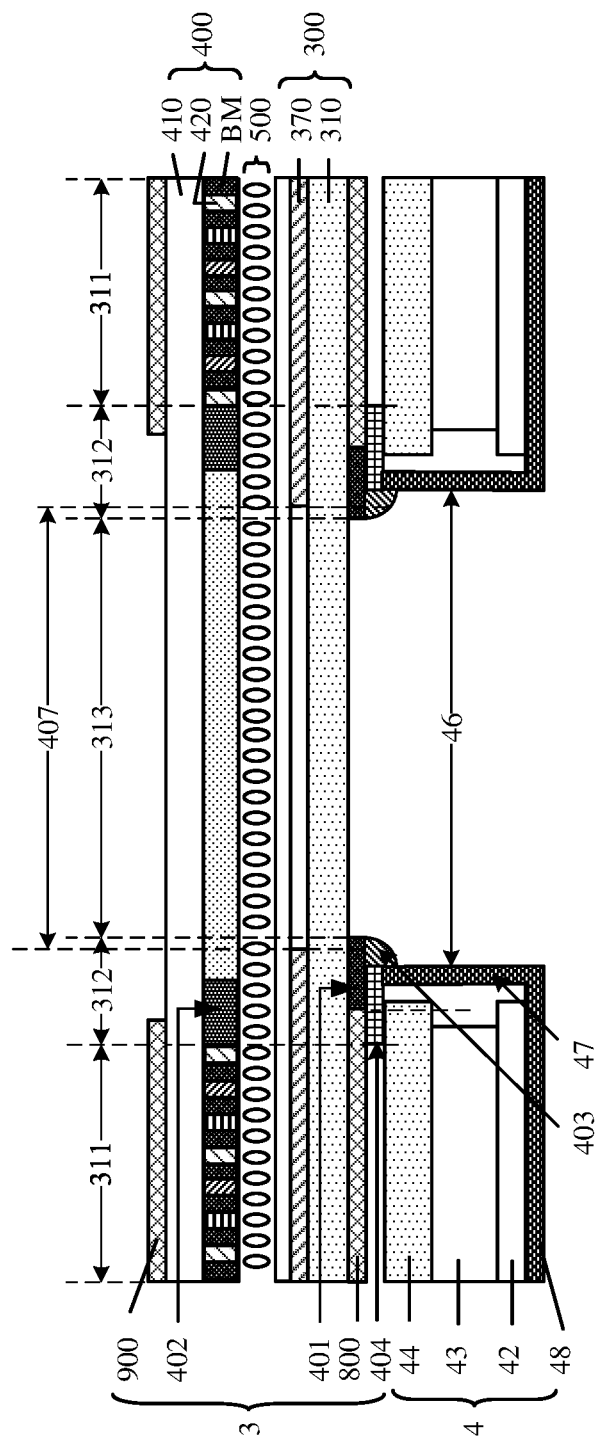
FIG. 16 is a schematic structural diagram of still another display component according to this application.
Figure 17A:
FIG. 17a is a schematic diagram of a portion that is in a longitudinal section of a first light shielding pattern and that is located on a side of a transparent region according to this application.
Figure 17B:
FIG. 17b is another schematic diagram of a portion that is in a longitudinal section of a first light shielding pattern and that is located on a side of a transparent region according to this application.
Figure 17C:
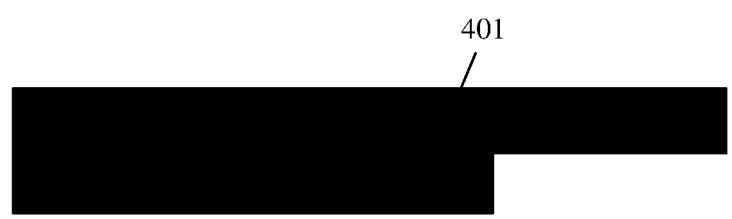
FIG. 17c is still another schematic diagram of a portion that is in a longitudinal section of a first light shielding pattern and that is located on a side of a transparent region according to this application.
Figure 17D:
FIG. 17d is yet another schematic diagram of a portion that is in a longitudinal section of a first light shielding pattern and that is located on a side of a transparent region according to this application.
Figure 17E:
FIG. 17e is yet another schematic diagram of a portion that is in a longitudinal section of a first light shielding pattern and that is located on a side of a transparent region according to this application.

Optionally, as shown in FIG. 16, the TFT circuit layer 370 is disposed on a side that is of the first substrate 310 of the array substrate 300 and that is close to the counter substrate 400. The TFT circuit layer 370 includes a fourth hollow-out region 407, and an edge of the fourth hollow-out region 407 is located in the light shielding region 312.

On this basis, the TFT circuit layer 370 can shield light and simplify fabrication.

It should be noted that the TFT circuit layer 370 includes the foregoing TFT.

Optionally, to ensure that light leakage is avoided, as shown in FIG. 8a, FIG. 8b, and FIG. 9 to FIG. 16, in the thickness direction of the display component, a projection of the second light shielding pattern 402 overlaps with the light shielding region 312, that is, the projection of the second light shielding pattern 402 is located in the entire light shielding region 312.

In addition, as shown in FIG. 8a, FIG. 8b, and FIG. 9 to FIG. 16, in the thickness direction of the display component, a projection of the first light shielding pattern 401 overlaps with the light shielding region 312, that is, the projection of the first light shielding pattern 401 is located in the entire light shielding region 312. Based on the foregoing descriptions, it may be understood that when the first light shielding pattern 401 is located in the second hollow-out region 801 of the lower polarizer 800, the projection of the first light shielding pattern 401 may occupy only a part of the light shielding region 312, or the projection of the first light shielding pattern 401 may overlap with the light shielding region 312.

Optionally, as shown in FIG. 15, the side frame 47 includes a side panel 471 disposed perpendicular to the display panel 3 and a top panel 472 parallel to the display panel 3. The top panel 472 is connected to an end that is of the side panel 471 and that is close to the display panel 3. In this case, the side frame 47 may be in an inverted L shape shown in FIG. 15. In addition, the side frame 47 may also be in a T shape.

The side frame 47 is disposed as a structure including the top panel 472 and the side panel 471, so that the display panel 3 and the backlight module 4 can be better fastened.

Optionally, as shown in FIG. 8a, FIG. 8b, FIG. 9 to FIG. 14, and FIG. 16, the side frame 47 includes a side panel 471 disposed perpendicular to the display panel 3.

On this basis, optionally, a material of the third light shielding pattern 403 is glue.

When the side frame 47 includes the side panel 471 disposed perpendicular to the display panel 3, a width of an upper surface that is of the side frame 47 and that is close to the display panel 3 is relatively narrow. When the material of the third light shielding pattern 403 is glue, on one hand, the display panel 3 and the backlight module 4 can be better fastened. On the other hand, when there is a gap between the side frame 47 and the display panel 3, the third light shielding pattern 403 is easily formed in the gap.

Figure 19:
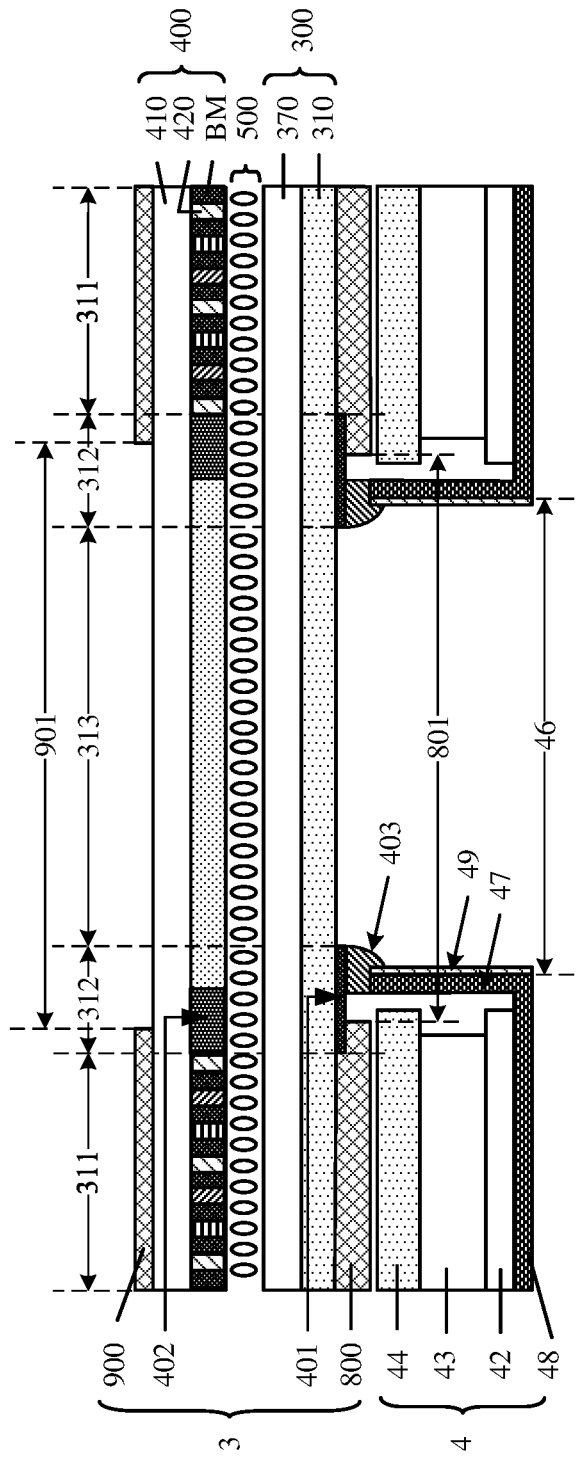
FIG. 19 is a schematic structural diagram of still another display component according to this application.

Optionally, as shown in FIG. 19, an anti-glare layer 49 located at least on an inner wall that is of the side frame 47 and that faces the first hollow-out region 46 is further disposed on the backlight module 4.

On this basis, the anti-glare layer 49 may also be disposed on the bottom plate 48. This is not specifically limited herein.

A material of the anti-glare layer 49 may be a black plating material such as ink and nickel.

It should be noted that the anti-glare layer 49 disposed on the inner wall that is of the side frame 47 and that faces the first hollow-out region 46 may be disposed only in a part of the inner wall that is of the side frame 47 and that faces the first hollow-out region 46, or the anti-glare layer 49 may completely cover the inner wall that is of the side frame 47 and that faces the first hollow-out region 46.

The anti-glare layer 49 may be disposed to further absorb light, so that the front-facing camera 6 better performs imaging.

This application further provides a display apparatus. As shown in FIG. 20 to FIG. 26a, the display apparatus includes the foregoing display component, and further includes a front-facing camera 6. The front-facing camera 6 is embedded in the first hollow-out region 46 of the backlight module 4. The display apparatus has the same beneficial effect as that of the foregoing display component. Details are not described herein again.

The display apparatus may be a product or a component that has any display function such as a liquid crystal display, a liquid crystal television, a digital photo frame, a mobile phone, and a tablet computer.

Optionally, the display apparatus is a terminal device, for example, a terminal device such as a mobile phone terminal, a watch, a tablet computer, a display, and a wearable device.

Optionally, as shown in FIG. 20 to FIG. 26a, in a direction from the display panel 3 to the front-facing camera 6, not all cross-sectional areas of the front-facing camera 6 are the same, and the cross-sectional areas of the front-facing camera gradually increase. In this way, the front-facing camera 6 can be closer to the display panel 3 and have a better photographing effect. In addition, a part of space can be saved in a vertical direction and the ripple problem is alleviated.

Figure 20:
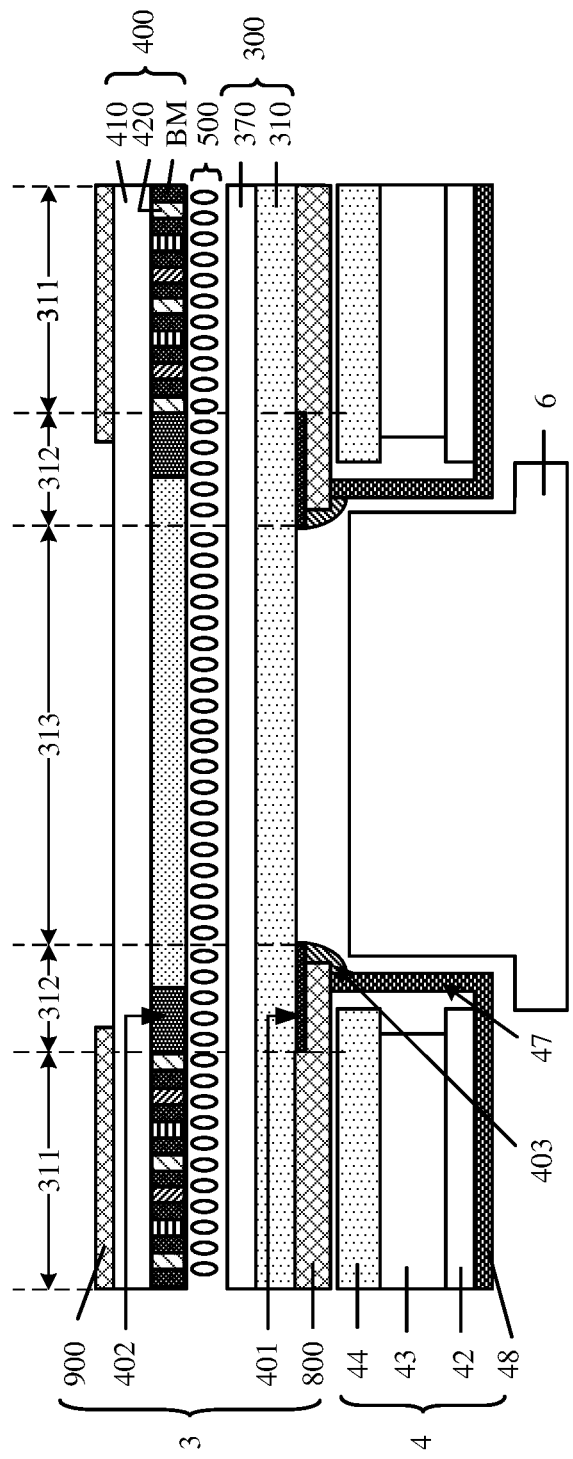
FIG. 20 is a schematic structural diagram of a display apparatus according to this application.

Optionally, as shown in FIG. 20, the front-facing camera 6 is in an inverted T shape.

Figure 21:
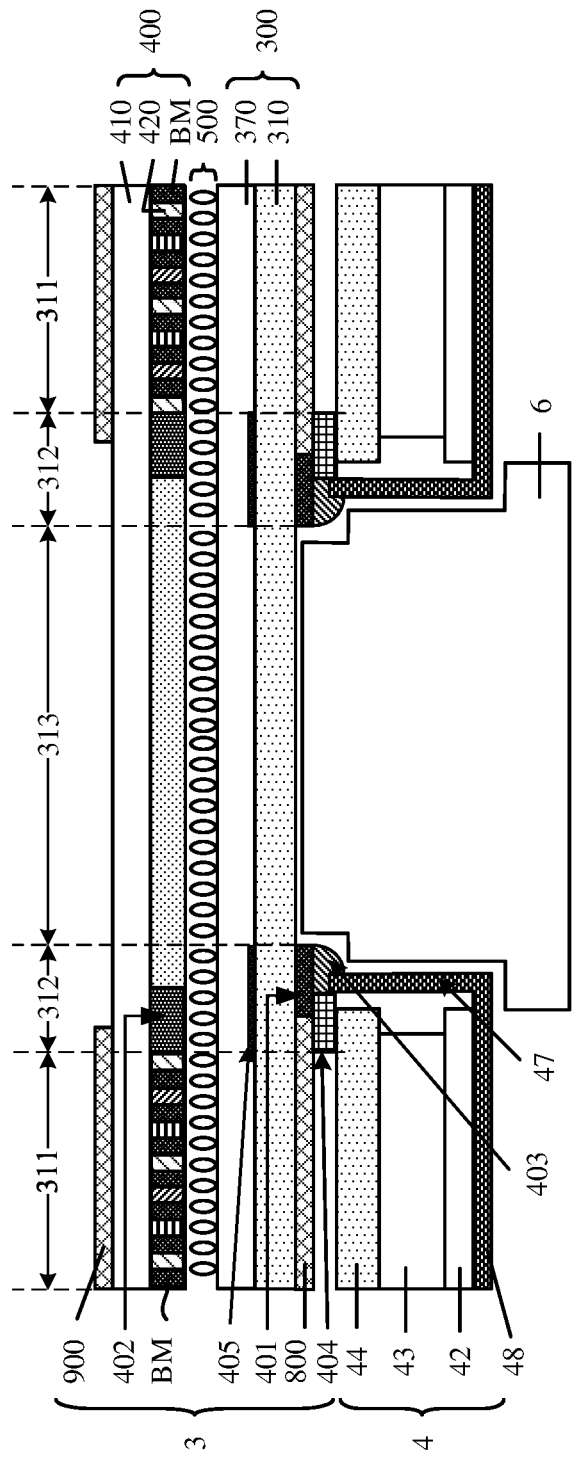
FIG. 21 is a schematic structural diagram of another display apparatus according to this application.

To further reduce a distance from the front-facing camera 6 to the display panel 3, as shown in FIG. 21, the front-facing camera 6 includes a plurality of tiers, so that the third light shielding pattern 403 extends into the tiers of the front-facing camera 6.

Figure 22A:
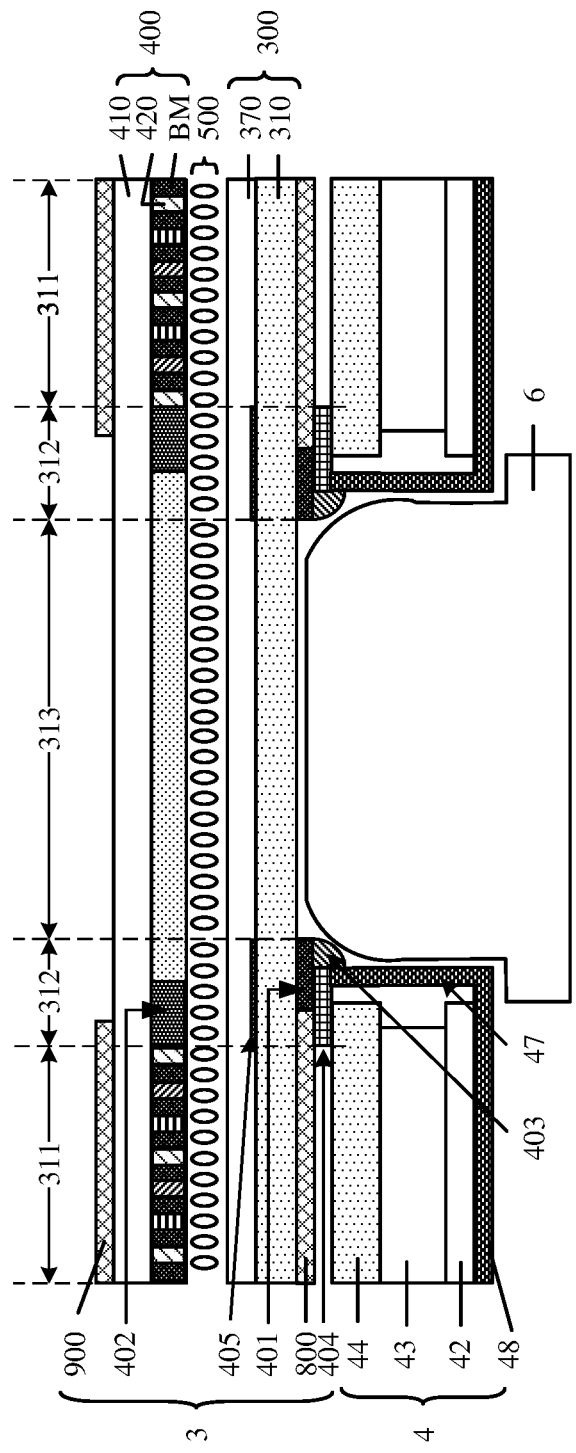
FIG. 22a is a schematic structural diagram of still another display apparatus according to this application.
Figure 22B:
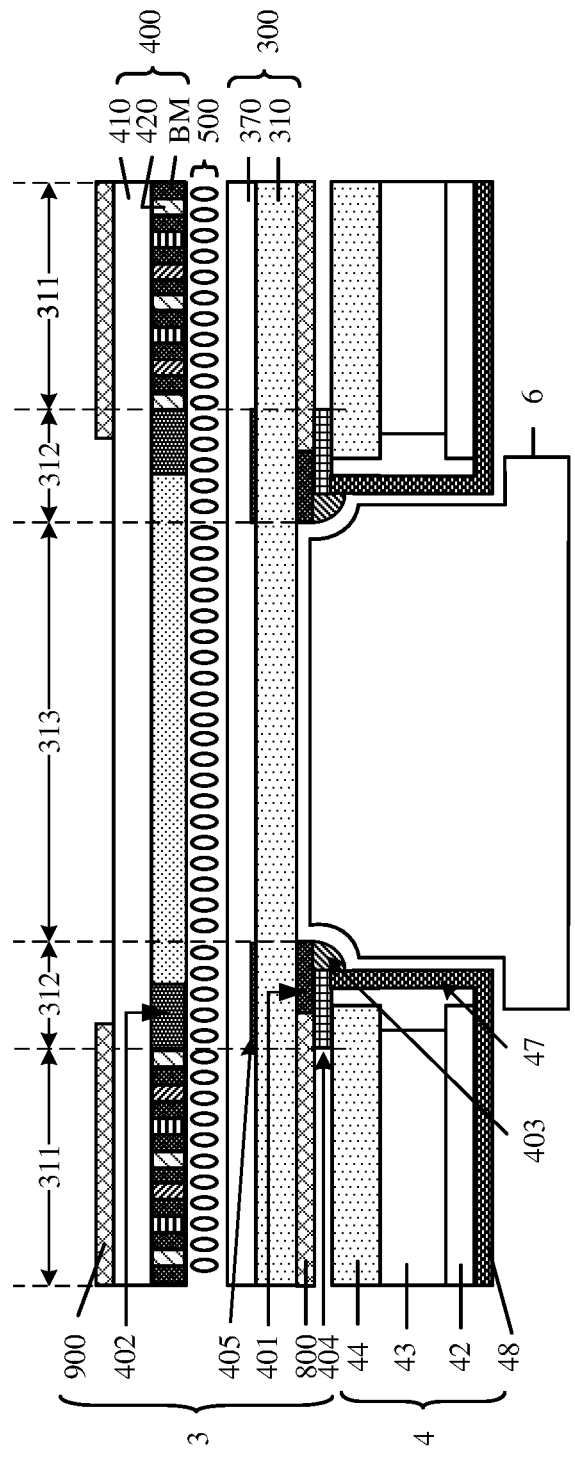
FIG. 22b is a schematic structural diagram of still another display apparatus according to this application.
Figure 23:
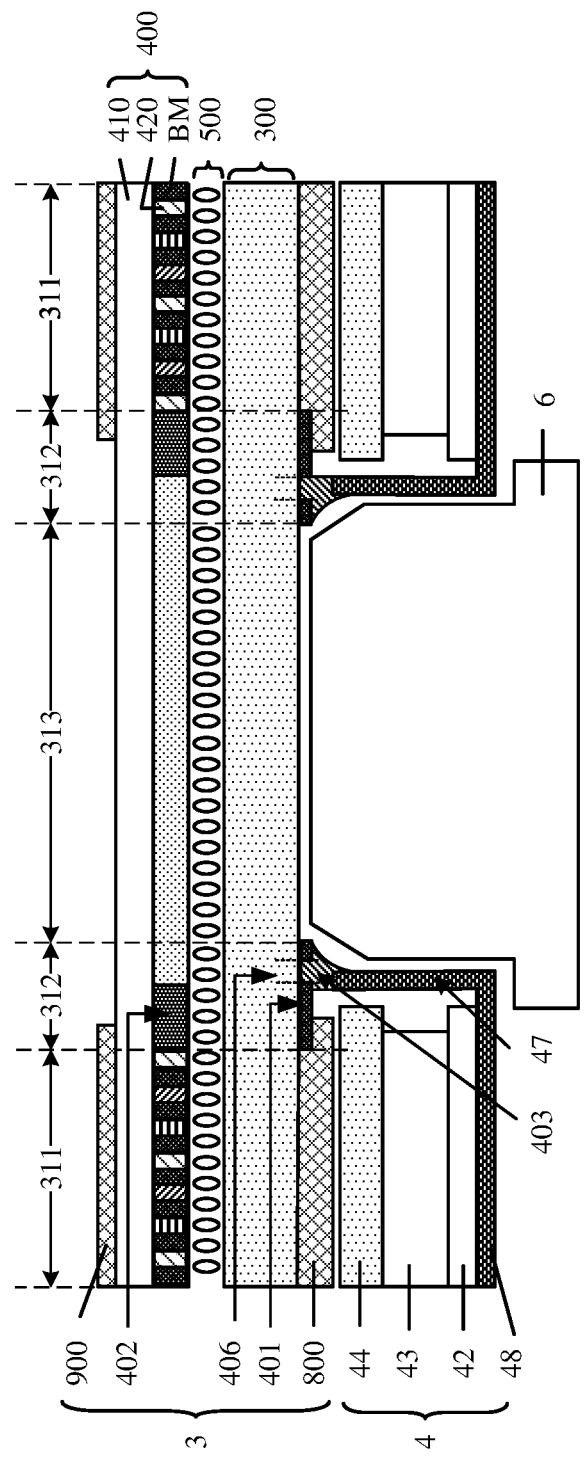
FIG. 23 is a schematic structural diagram of yet another display apparatus according to this application.

Optionally, as shown in FIG. 22a, FIG. 22b, and FIG. 23, a chamfer is disposed on a side that is of the front-facing camera 6 and that is close to the display panel 3.

The chamfer is disposed on the side that is of the front-facing camera 6 and that is close to the display panel 3, to avoid that the front-facing camera 6 cannot be further close to the display panel 3 because the third light shielding pattern 403 protrudes outward. A position of the chamfer corresponds to the third light shielding pattern 403, and may bypass the third light shielding pattern 403 and is not in contact with the third light shielding pattern 403.

The following describes an example of forming the chamfer on the front-facing camera 6.

Figure 24:
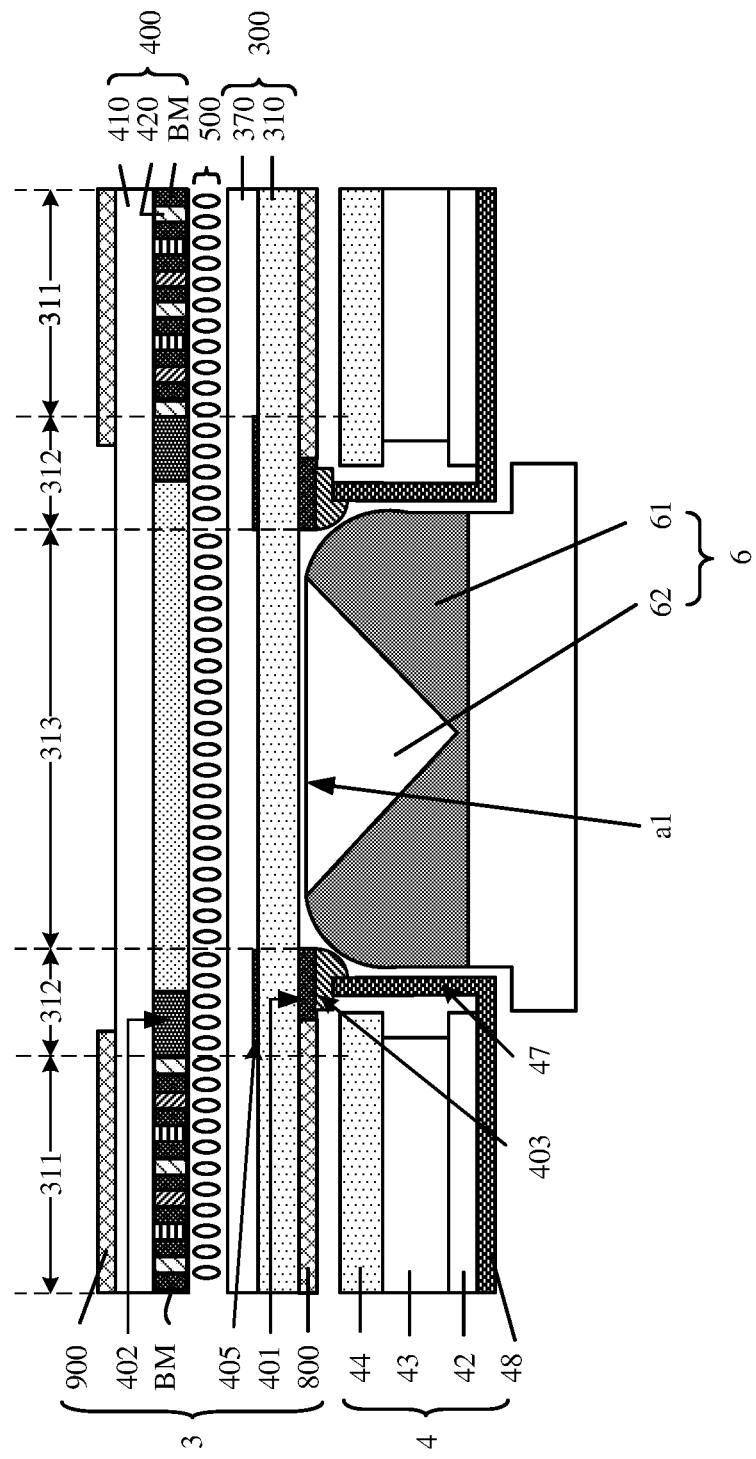
FIG. 24 is a schematic structural diagram of yet another display apparatus according to this application.
Figure 25:
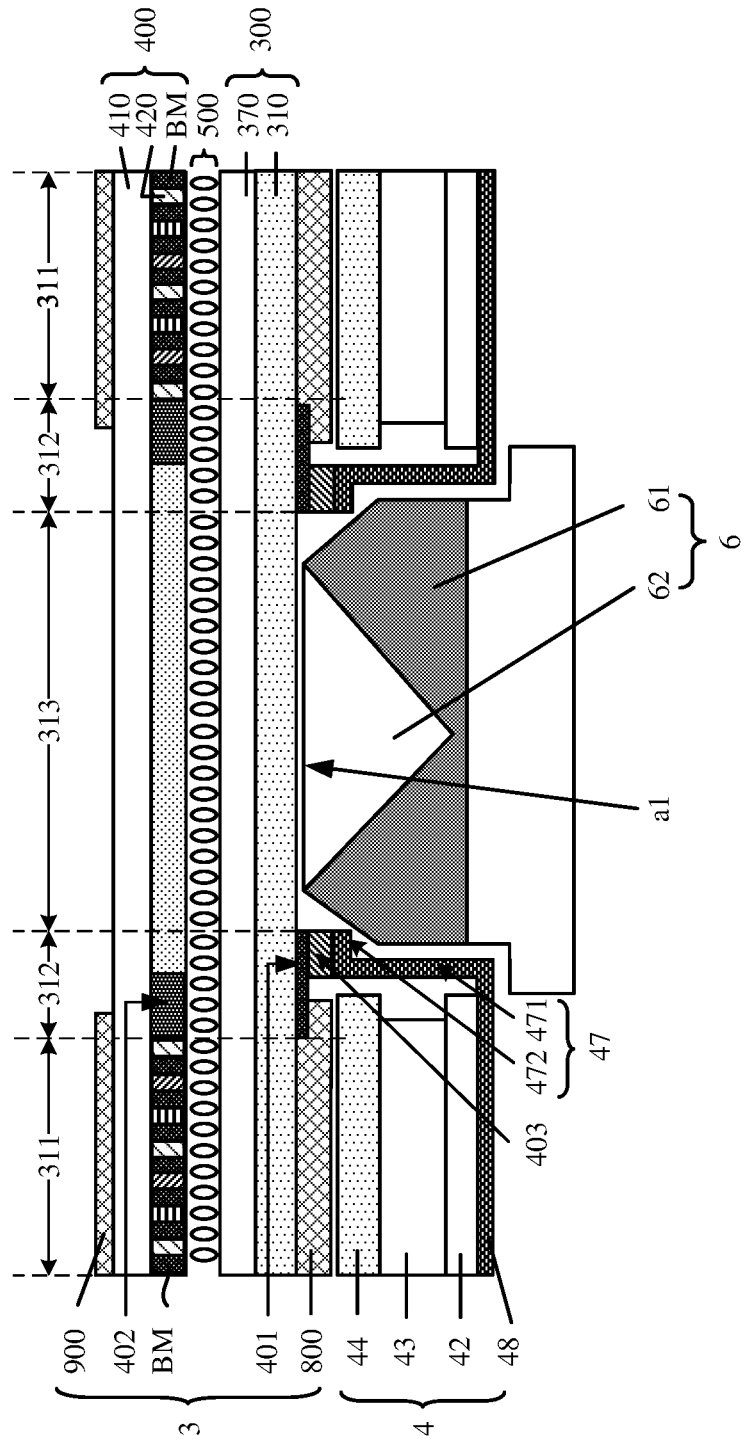
FIG. 25 is a schematic structural diagram of yet another display apparatus according to this application.

For example, as shown in FIG. 24 and FIG. 25, the front-facing camera 6 includes a camera. The camera includes a lens barrel 61 and a lens group 62 accommodated in the lens barrel. The lens barrel 61 is exposed from a light incident surface a1 of the lens group 62.

Figure 26A:
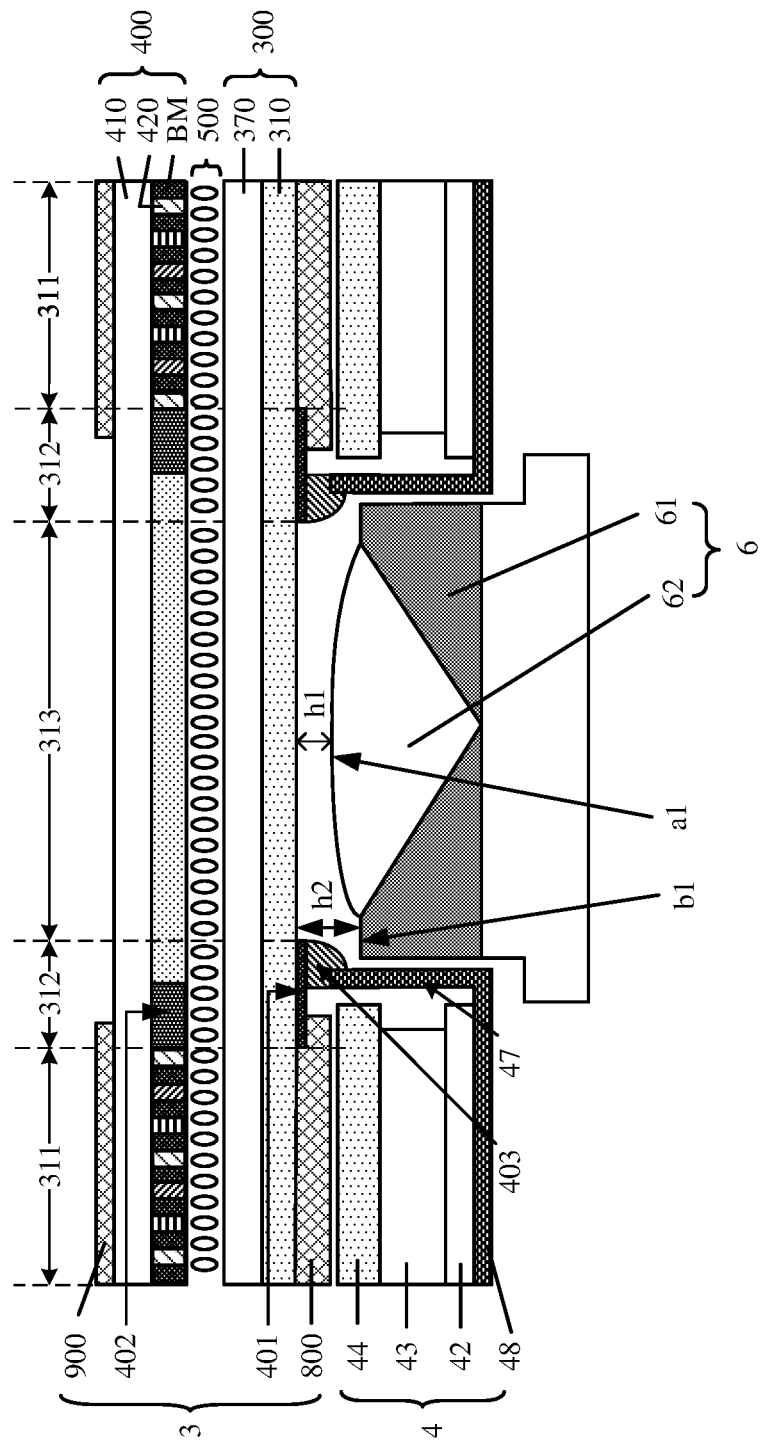
FIG. 26a is a schematic structural diagram of yet another display apparatus according to this application.

It may be understood that the light incident surface a1 of the lens group 62 is a surface that is of the lens group 62 and that is used for receiving incident light. As shown in FIG. 26a, the light incident surface a1 of the lens group 62 faces the display panel 3.

The chamfer on the side that is of the front-facing camera 6 and that is close to the display panel 3 may be, for example, a chamfer disposed on a side that is of the lens barrel 61 of the front-facing camera 6 and that is close to the display panel 3.

The chamfer may be formed, for example, by removing a part of black material from the lens barrel 61 of the front-facing camera 6. A removed region includes, but is not limited to, a region such as a chamfer, a fillet, and a right angle.

The chamfer may alternatively be formed by directly forming the lens barrel 61 including the chamfer during forming of the lens barrel 61.

Optionally, as shown in FIG. 26a, in the thickness direction of the display component, a distance h1 from the light incident surface a1 of the lens group 62 to the display panel 3 is less than a distance h2 from a surface b1 that is of the lens barrel 61 and that faces the display panel 3 to the display panel 3.

It may be understood that when the light incident surface a1 is not a plane, the distance h1 from the light incident surface a1 to the display panel 3 is a minimum value of distances from points on the light incident surface a1 to the display panel 3, that is, a distance from a point that is on the light incident surface a1 and that is closest to the display panel 3.

Optionally, the surface b1 that is of the lens barrel 61 and that faces the display panel 3 is parallel to the display panel 3.

In this way, this is equivalent to that the lens group 62 is closer to the display panel 3 than the lens barrel 61, so that a distance between the front-facing camera 6 and the display panel 3 can be reduced.

Figure 26B:
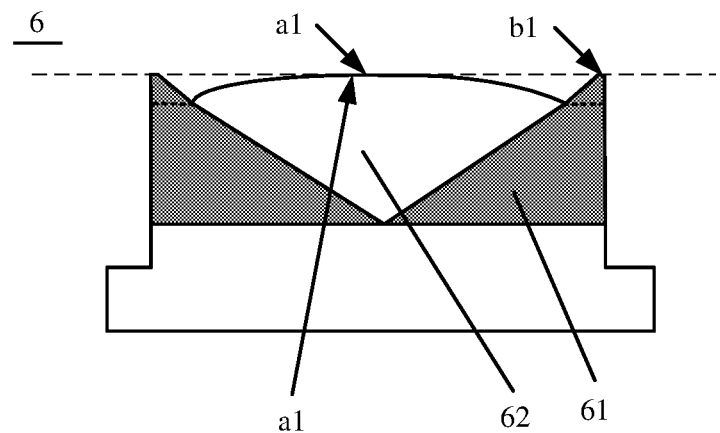
FIG. 26b is a schematic structural diagram of a front-facing camera according to an embodiment of this application.

For example, the lens barrel 61 may be fabricated into a structure shown in FIG. 26b, so that the surface b1 of the lens barrel 61 and a highest position of the light incident surface a1 of the lens group 62 are on a same surface. Then, removing is performed around the lens group 62 along a dashed line position in FIG. 26b, to form a structure shown in FIG. 26c.

Figure 26C:
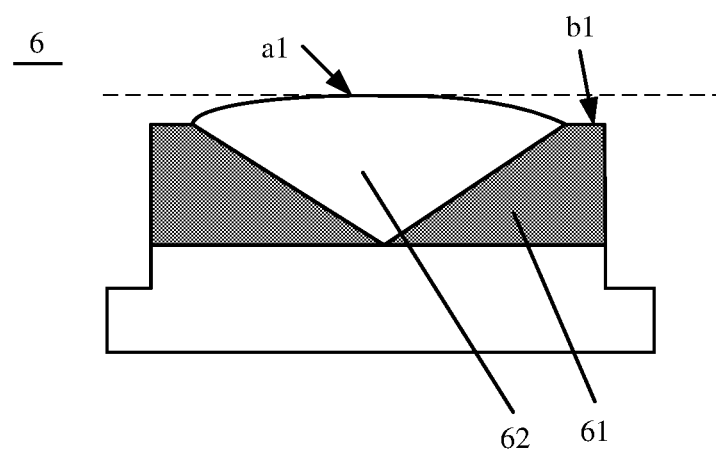
FIG. 26c is a schematic structural diagram of another front-facing camera according to an embodiment of this application.
Figure 27A:
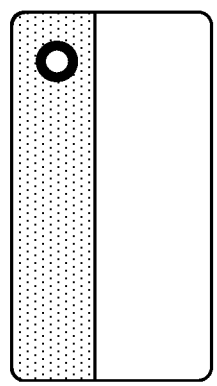
FIG. 27a is a schematic diagram in which a part of a display apparatus is in a black state when a front-facing camera works according to this application.
Figure 27B:
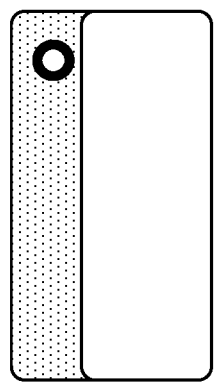
FIG. 27b is another schematic diagram in which a part of a display apparatus is in a black state when a front-facing camera works according to this application.
Figure 27C:
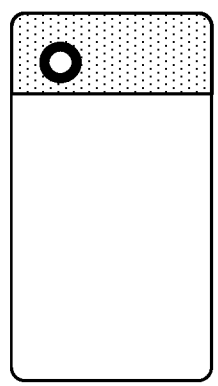
FIG. 27c is still another schematic diagram in which a part of a display apparatus is in a black state when a front-facing camera works according to this application.
Figure 27D:
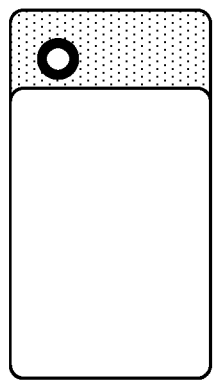
FIG. 27d is yet another schematic diagram in which a part of a display apparatus is in a black state when a front-facing camera works according to this application.
Figure 27E:
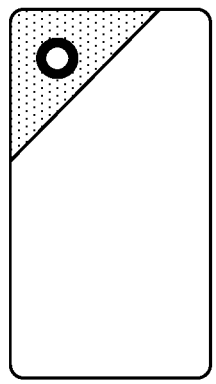
FIG. 27e is yet another schematic diagram in which a part of a display apparatus is in a black state when a front-facing camera works according to this application.
Figure 27F:
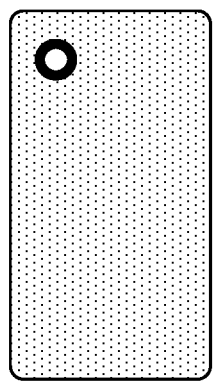
FIG. 27f is yet another schematic diagram in which an entire region of a display apparatus is in a black state when a front-facing camera works according to this application.

Alternatively, the lens barrel 61 may be directly fabricated into the structure shown in FIG. 26c.

As can be learned by comparing FIG. 26b with FIG. 26c, a cross-sectional area of the surface b1 of the lens barrel 61 in FIG. 26c is greater than that of the surface b1 of the lens barrel 61 in FIG. 26b, and a precision requirement and fabrication difficulty are low. Therefore, if the lens barrel 61 is directly fabricated into the structure shown in FIG. 26c, a process requirement can be lowered and fabrication can be simplified.

This application further provides a method for driving a display apparatus. A front-facing camera of the display apparatus is disposed opposite to a transparent region of a display region. The display region further includes a pixel region and a light shielding region, and the light shielding region is located between the transparent region and the pixel region.

The method for driving includes: when the front-facing camera works, as shown in FIG. 27a to FIG. 27f, controlling at least a part of the pixel region of the display region to be in a black state, where the part includes at least a region located around the light shielding region.

When the front-facing camera photographs, at least the part of the pixel region is controlled to be in the black state, to reduce impact caused by light leakage on photographing, thereby further improving an imaging effect.

Optionally, the controlling at least a part of the pixel region to be in a black state includes: controlling a backlight module of the display apparatus to be turned off. In this case, the entire pixel region is in the black state. On this basis, the backlight module may be a direct-type backlight module or an edge-type backlight module.

Optionally, the controlling at least a part of the pixel region to be in a black state includes: controlling all subpixels in at least the part of the pixel region to display a black picture.

That is, an amount of output light is controlled by controlling an electric field in the subpixels (that is, an electric field formed by a pixel electrode and a common electrode), so that all the subpixels in at least the part display a black picture.

Alternatively, when the backlight module of the display apparatus is a direct-type backlight module, the controlling at least a part of the pixel region to be in a black state includes: controlling a light source of a region that is in the direct-type backlight module and that is opposite to at least the part of the pixel region to be turned off.

That is, a brightness of the light source in the direct-type backlight module is controlled based on region differentiation, so that at least the part of the pixel region is in the black state.

It should be noted that the black state may be displaying the black color at an instant of photographing, so that preview and usage of a user are not affected while a photographing effect is ensured.

Optionally, as shown in FIG. 27a to FIG. 27f, the part in the black state is located at a top, a bottom, a side, a corner, or any position in a full screen of the display apparatus, and/or a shape of the part in the black state is any closed pattern.

A shape of the part in the black state includes, but is not limited to, a circle, a rectangle, a square, a polygon, and the like, and a position of the part in the black state is not limited either.

This application provides the method for driving the display apparatus, so that when the front-facing camera works, at least the part of the pixel region is controlled to be in the black state, to reduce impact caused by light leakage on photographing. In addition, the shape and the distribution position of the part in the black state are not limited. In addition, the black picture is displayed in black at an instant of photographing, so that preview and usage of a user are not affected while a photographing effect is ensured.

The technology in this application not only may be applied to a mobile phone terminal, but also may be applied to another terminal having a display screen such as a watch, a tablet computer, a display, and a wearable device.

The foregoing are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display component, comprising:
   a display panel, comprising an array substrate and a counter substrate, wherein the array substrate comprises a first substrate and a thin film transistor (TFT) circuit layer, the TFT circuit layer is disposed on a side of the first substrate that faces the counter substrate, and a fifth light shielding pattern is disposed in the array substrate; and
   a backlight module; and
   wherein a display region of the display panel comprises a pixel region, a transparent region, and a light shielding region located between the pixel region and the transparent region, wherein the light shielding region is disposed around the transparent region;
   wherein a first light shielding pattern located in the light shielding region is disposed on a side of the array substrate that faces away from the counter substrate, the first light shielding pattern is disposed around the transparent region, and a first edge of the light shielding region is defined by a sidewall of the first light shielding pattern;
   wherein a second light shielding pattern located in the light shielding region is disposed on the counter substrate, the second light shielding pattern is disposed around the transparent region, a second edge of the light shielding region is defined by a sidewall of the second light shielding pattern, and the first edge and the second edge are same edges or different edges;
   wherein the backlight module is located on a side of the display panel that faces away from a light emergent surface of the display panel;
   wherein a first hollow-out region is within the backlight module, the first hollow-out region is defined by a side frame of the backlight module, the side frame is opaque, and in a thickness direction of the display component, an edge of the first hollow-out region is located in the light shielding region;
   wherein a third light shielding pattern is located in the light shielding region and is in contact with both the first light shielding pattern and the side frame, and the third light shielding pattern is disposed around the transparent region and is configured to absorb light that leaks from a side of the side frame;
   wherein the TFT circuit layer comprises a fourth hollow-out region, and an edge of the fourth hollow-out region is located in the light shielding region and overlaps the first light shielding pattern in a plan view; and
   wherein projections of the second light shielding pattern and the fifth light shielding pattern are overlapped and located in an entire area of the light shielding region.

2. The display component according to claim 1, wherein a gap is between the side frame and the display panel, and the third light shielding pattern is disposed at least in the gap between the side frame and the display panel.

3. The display component according to claim 1, wherein a lower polarizer is disposed on the array substrate, a second hollow-out region is within the lower polarizer, and in the thickness direction of the display component, a projection of a side face that is of the lower polarizer and that defines the second hollow-out region is located in the light shielding region.

4. The display component according to claim 3, wherein:
the side face that is of the lower polarizer and that defines the second hollow-out region is located on a side that is of the side frame and that faces away from the first hollow-out region; and
the first light shielding pattern is located in the second hollow-out region of the lower polarizer and extends at least above the side frame.

5. The display component according to claim 4, wherein:
the first light shielding pattern is directly in contact with the lower polarizer; and
a gap is between the side frame and the first light shielding pattern.

6. The display component according to claim 5, wherein:
the display component further comprises a fourth light shielding pattern disposed between the display panel and the backlight module, wherein in the thickness direction of the display component, the fourth light shielding pattern is disposed opposite to the light shielding region, and the fourth light shielding pattern is disposed around the transparent region; and
the fourth light shielding pattern overlaps with a portion that is of the lower polarizer and that faces the first light shielding pattern and a portion that is of the first light shielding pattern and that faces the lower polarizer, the fourth light shielding pattern is located on the side that is of the side frame and that faces away from the first hollow-out region, and the fourth light shielding pattern is in contact with at least the backlight module.

7. The display component according to claim 4, wherein:
the display component further comprises a fourth light shielding pattern disposed between the display panel and the backlight module, in the thickness direction of the display component, the fourth light shielding pattern is disposed opposite to the light shielding region; and the fourth light shielding pattern is disposed around the transparent region;
the fourth light shielding pattern overlaps with a portion that is of the lower polarizer and that faces the first light shielding pattern and a portion that is of the first light shielding pattern and that faces the lower polarizer; and
the fourth light shielding pattern extends above the side frame and is in contact with the side frame.

8. The display component according to claim 4, wherein:
the fifth light shielding pattern is disposed around the transparent region; and
the fifth light shielding pattern is located between the first substrate of the array substrate and the TFT circuit layer disposed on a side that is of the first substrate and that faces the counter substrate, and the fifth light shielding pattern covers a part of the lower polarizer.

9. The display component according to claim 2, wherein the third light shielding pattern extends from the gap between the side frame and the display panel to a side that is of the side frame and that faces the first hollow-out region, and is in contact with a portion of a side face of the side frame.

10. The display component according to claim 1, wherein a black matrix located in the pixel region is disposed on the counter substrate, and the second light shielding pattern and the black matrix are on a same layer and are made of a same material.

11. The display component according to claim 1, wherein the side frame comprises a side panel disposed perpendicular to a major surface of the display panel and a top panel parallel to the major surface of the display panel, and the top panel is connected to an end that is of the side panel and that faces the display panel.

12. The display component according to claim 1, wherein an anti-glare layer located at least on an inner wall that is of the side frame and that faces the first hollow-out region is further disposed on the backlight module.

13. The display component according to claim 1, wherein an upper polarizer is disposed on the counter substrate, a third hollow-out region is in the upper polarizer, and in a thickness direction of the display component, a projection of a side face that is of the upper polarizer and that defines the third hollow-out region is located in the light shielding region.

14. A display apparatus, comprising:
a display component, comprising a display panel and a backlight module, the display panel comprising an array substrate and a counter substrate, wherein the array substrate comprises a first substrate and a thin film transistor (TFT) circuit layer, the TFT circuit layer is disposed on a side of the first substrate that faces the counter substrate, and a fifth light shielding pattern is disposed in the array substrate; and
a front-facing camera, wherein the front-facing camera is embedded in a first hollow-out region of the backlight module;
wherein a display region of the display panel comprises a pixel region, a transparent region, and a light shielding region located between the pixel region and the transparent region, wherein the light shielding region is disposed around the transparent region;
wherein a first light shielding pattern located in the light shielding region is disposed on a side of the array substrate that faces away from the counter substrate, the first light shielding pattern is disposed around the transparent region, and a first edge of the light shielding region is defined by a sidewall of the first light shielding pattern; and
wherein a second light shielding pattern located in the light shielding region is disposed on the counter substrate, the second light shielding pattern is disposed around the transparent region, a second edge of the light shielding region is defined by a sidewall of the second light shielding pattern, and the first edge and the second edge are same edges or different edges;
wherein the backlight module is located on a side of the display panel that faces away from a light emergent surface of the display panel;
wherein the first hollow-out region is within the backlight module, the first hollow-out region is defined by a side frame of the backlight module, the side frame is opaque, and in a thickness direction of the display component, an edge of the first hollow-out region is located in the light shielding region;
wherein a third light shielding pattern is located in the light shielding region and is in contact with both the first light shielding pattern and the side frame, and the third light shielding pattern is disposed around the transparent region and is configured to absorb light that leaks from a side of the side frame;

wherein the TFT circuit layer comprises a fourth hollow-out region, and an edge of the fourth hollow-out region is located in the light shielding region and overlaps the first light shielding pattern in a plan view; and wherein projections of the second light shielding pattern and the fifth light shielding pattern are overlapped and located in an entire area of the light shielding region.

15. The display apparatus according to claim 14, wherein in a direction from the display panel to the front-facing camera, not all cross-sectional areas of the front-facing camera are the same and the cross-sectional areas of the front-facing camera gradually increase.

16. The display apparatus according to claim 15, wherein the front-facing camera is in an inverted T shape, and a chamfer is disposed on a side that is of the front-facing camera and that faces the display panel.

17. The display apparatus according to claim 15, wherein the front-facing camera comprises a lens barrel and a lens group accommodated in the lens barrel, and the lens barrel is exposed from a light incident surface of the lens group; and in a thickness direction of the display component, a distance from the light incident surface to the display panel is less than a distance from a surface that is of the lens barrel and that faces the display panel to the display panel.

18. The display apparatus according to claim 14, wherein the display apparatus is a terminal device.

\* \* \* \* \*